(12) United States Patent
Pope

(10) Patent No.: US 12,189,710 B2
(45) Date of Patent: Jan. 7, 2025

(54) SPARSE MATRIX MULTIPLICATION IN HARDWARE

(71) Applicant: Google LLC, Mountain View, CA (US)

(72) Inventor: Reiner Alwyn Pope, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 854 days.

(21) Appl. No.: 17/329,259

(22) Filed: May 25, 2021

(65) Prior Publication Data

US 2022/0382829 A1 Dec. 1, 2022

(51) Int. Cl.
| | | |
|---|---|---|
| *G06F 17/16* | (2006.01) | |
| *G06F 7/487* | (2006.01) | |
| *G06F 7/501* | (2006.01) | |
| *G06F 7/78* | (2006.01) | |
| *G06N 3/08* | (2023.01) | |

(52) U.S. Cl.
CPC ............ *G06F 17/16* (2013.01); *G06F 7/4876* (2013.01); *G06F 7/501* (2013.01); *G06F 7/78* (2013.01); *G06N 3/08* (2013.01)

(58) Field of Classification Search
CPC ........ G06F 17/16; G06F 7/4876; G06F 7/501; G06F 7/5443; G06F 7/78; G06F 16/1744; G06N 3/04; G06N 3/0442; G06N 3/0464; G06N 3/0495; G06N 3/063; G06N 3/08; G06N 3/082

See application file for complete search history.

(56) References Cited

U.S. PATENT DOCUMENTS

| | | | |
|---|---|---|---|
| 9,697,176 | B2 | 7/2017 | Daga et al. |
| 9,760,538 | B2 | 9/2017 | Zhou |
| 10,180,928 | B2 | 1/2019 | Nurvitadhi et al. |
| 10,489,063 | B2 | 11/2019 | Mishra et al. |
| 10,489,480 | B2 | 11/2019 | Akerib |
| 10,528,321 | B2 | 1/2020 | Bittner et al. |
| 10,726,096 | B2 | 7/2020 | Chatterjee et al. |
| 2018/0189638 | A1 | 7/2018 | Nurvitadhi et al. |
| 2022/0374496 | A1* | 11/2022 | Wang ...................... G06F 17/16 |

OTHER PUBLICATIONS

Nvidia, Cusparse Library, DU-06709-001_v10.1, 2019 (Year: 2019).*

(Continued)

*Primary Examiner* — Emily E Larocque
(74) *Attorney, Agent, or Firm* — Lerner David LLP

(57) ABSTRACT

Aspects of the disclosure provide for methods, systems, and apparatuses, including computer-readable storage media, for sparse matrix multiplication. A system for matrix multiplication includes an array of sparse shards. Each sparse shard can be configured to receive an input sub-matrix and an input sub-vector, where the input sub-matrix has a number of non-zero values equal to or less than a predetermined maximum non-zero threshold. The sparse shard can, by a plurality of multiplier circuits, compute one or more products of vector values multiplied with respective non-zero values of the input sub-matrix. The sparse shard can generate, as output to the sparse shard and using the one or more products, a shard output vector that is the product of applying the shard input vector to the shard input matrix.

20 Claims, 13 Drawing Sheets

(56) References Cited

OTHER PUBLICATIONS

A. Chakrabarty et al., Matrix-based Nonblocking Routing Algorithm for Benes Networks, 2009 Computation World: Future Computing, Service Computation, Cognitive, Adaptive, Patterns, IEEE Computer Society 2009 (Year: 2009).*

Bell et al., "Implementing Sparse Matrix-Vector Multiplication on Throughput-Oriented Processors," ACM, 2009. 11 pages.

Flowers et al., "A High Memory Bandwidth FPGA Accelerator for Sparse Matrix-Vector Multiplication," [online] [retrieved Mar. 9, 2021]. Retrieved from the Internet: <URL:https://www.microsoft.com/en-us/research/wp-content/uploads/2016/02/smvm_fccm_2014-final.pdf>, (undated) 8 pages.

He et al., "Sparse-TPU: Adapting Systolic Arrays for Sparse Matrices," 2020 International Conference on Supercomputing (ICS '20), Jun. 29-Jul. 2, 2020, Barcelona, Spain. ACM, New York, NY, USA, 12 pages.

Nvidia A100 Tensor Core GPU Architecture Unprecedented Acceleration at Every Scale, [online] [retrieved Mar. 9, 2021]. Retrieved from the Internet: <URL:https://www.nvidia.com/content/dam/en-zz/Solutions/Data-Center/nvidia-ampere-architecture-whitepaper.pdf>, (undated) pp. 31-33 of 82 pages.

Systolic Architectures, [online] [retrieved Mar. 9, 2021]. Retrieved from the Internet: <URL:http:/web.cecs.pdx.edu/~mperkows/temp/May22/0020.Matrix-multiplication-systolic.pdf>, (undated) 9 pages.

Extended European Search Report for European Patent Application No. 22155308.4 dated Jul. 15, 2022. 10 pages.

Qin et al. SIGMA: A Sparse and Irregular GEMM Accelerator with Flexible Interconnects for DNN Training. Feb. 22, 2020. 2020 IEEE International Symposium on High Performance Computer Architecture (HPCA), IEEE, pp. 58-70.

Stevens et al. GNNerator: A Hardware/Software Framework for Accelerating Graph Neural Networks. Mar. 19, 2021. ARXIV.org, Cornell University Library, 201 Olin Library Cornell University, Ithaca, NY 14853, 7 pages.

Yan et al. HyGCN: A GCN Accelerator with Hybrid Architecture. Feb. 22, 2020. 2020 IEEE International Symposium on High Performance Computer Architecture (HPCA), IEEE, pp. 15-29.

Office Action for Japanese Patent Application No. 2021-207147 dated Jun. 6, 2023. 6 pages.

Office Action for Korean Patent Application No. 10-2022-0016772 dated Jun. 26, 2023. 6 pages.

Notice of Allowance for Korean Patent Application No. 10-2022-0016772 dated Aug. 29, 2023. 3 pages.

* cited by examiner

SPARSE MATRIX MULTIPLICATION IN HARDWARE

BACKGROUND

A sparse matrix is a matrix with a higher proportion of zero values to non-zero values as elements of the matrix. Different sparse matrices can have varying degrees of sparsity based on the proportion of zero to non-zero values. Matrices with a higher proportion of zero to non-zero values are said to have a higher sparsity than matrices with a lower proportion.

Neural networks are machine learning models that include one or more layers of nonlinear operations to predict an output for a received input. In addition to an input layer and an output layer, some neural networks include one or more hidden layers. The output of each hidden layer can be input to another hidden layer or the output layer of the neural network. Each layer of the neural network can generate a respective output from a received input according to values for one or more model parameters for the layer. The model parameters can be weights or biases that are determined through a training algorithm to cause the neural network to generate accurate output. Model parameter values for a layer of a neural network can be represented as elements of a matrix or tensor.

BRIEF SUMMARY

Aspects of the disclosure are directed to sparse matrix dense vector multiplication in hardware.

One aspect of the disclosure provides for a system including a sparse shard including a plurality of multiplier circuits, wherein the sparse shard is configured to: receive a shard input matrix including a number of non-zero values equal to or less than a predetermined maximum non-zero threshold; receive a shard input vector including a plurality of vector values; receive, for each of the multiplier circuits, a respective non-zero value of the shard input matrix; generate, by the plurality of multiplier circuits, one or more products of vector values multiplied with the respective non-zero values of the shard input matrix; and generate, as output to the sparse shard and using the one or more products, a shard output vector that is the product of applying the shard input vector to the shard input matrix.

Another aspect of the disclosure provides for one or more non-transitory computer-readable storage media storing instructions that when executed by a system including a plurality of sparse shards, causes the system to perform operations including: receiving, by a sparse shard including a plurality of multiplier circuits, a shard input matrix including a number of non-zero values equal to or less than a predetermined maximum non-zero threshold, and a shard input vector including a plurality of vector values; receiving, for each of the multiplier circuits, a respective non-zero value of the shard input matrix; generating, by the plurality of multiplier circuits of the sparse shard, one or more products of respective vector values multiplied with the respective non-zero values; and generating, as output to the sparse shard and using the one or more products, a shard output vector that is the product of applying the shard input vector to the shard input matrix.

Another aspect of the disclosure provides for a method including: receiving, by a sparse shard including a plurality of multiplier circuits, a shard input matrix including a number of non-zero values equal to or less than a predetermined maximum non-zero threshold, and a shard input vector including a plurality of vector values; receiving, for each of the multiplier circuits, the respective non-zero value of the shard input matrix; generating, by the plurality of multiplier circuits of the sparse shard, one or more products of respective vector values multiplied with the respective non-zero values of the shard input matrix; and generating, by the sparse shard, as output to the sparse shard and using the one or more products, a shard output vector that is the product of applying the shard input vector to the shard input matrix.

The foregoing and other aspects can each optionally include one or more of the following features, alone or in combination. One implementation can include all of the following features in combination.

The length of the shard output vector is greater than one.

The sparse shard is one of a plurality of sparse shards configured to: receive a plurality of shard input matrices that are sub-matrices of a system input matrix; receive a plurality of shard input vectors that are sub-vectors of a system input vector; and generate, by the plurality of sparse shards, a system output vector representing the product of applying the system input vector to the system input matrix.

The plurality of sparse shards are arranged as a systolic array including one or more groups of sparse shards along a column dimension of the systolic array; and wherein to generate the system output vector, the one or more processors are further configured to: for each group along the column dimension of the systolic array, add a respective shard output vector for each sparse shard in the group together to generate a respective column output vector; and concatenate the respective column output vector of each group to generate the system output vector.

Each multiplier circuit is coupled to a respective register including the respective non-zero value from the respective shard input matrix for the sparse shard.

The number of multiplier circuits in the plurality of multiplier circuits is equal to the predetermined maximum non-zero threshold.

The sparse shard further includes a crossbar circuit, and wherein the sparse shard is further configured to: receive, by the crossbar circuit, the plurality of vector values of the shard input vector; and send, as input to each of the plurality of multiplier circuits and by the crossbar circuit, a vector value of the plurality of vector values.

The sparse shard is further configured to: load non-zero values of a same column in the shard input matrix in registers of adjacent multiplier circuits of the plurality of multiplier circuits.

The sparse shard is further configured to receive one or more control values at least specifying positions of non-zero values along each column of the shard input matrix; and wherein the crossbar circuit for the sparse shard is further configured to: receive the one or more control values; and send, according to the one or more control values, vector values to be multiplied with non-zero values along a same column of the shard input matrix to adjacent multiplier circuits.

The sparse shard further includes a plurality of adder circuits, wherein the sparse shard further includes one or more segment markers, wherein each segment marker is configured to gate input to a respective adder circuit of the plurality of adder circuits based on a value for a respective control value loaded in the segment marker; and wherein the sparse shard is further configured to: load at least a portion of the one or more control values in the one or more segment markers, wherein adder circuits for non-zero values in a first column of the shard input matrix are gated from receiving input of adjacent adder circuits including non-zero values in a second column of the shard input matrix different from the first column; and generate, by the plurality of adder circuits, one or more sums of the one or more products, wherein each of the one or more sums is a respective segmented sum of one or more non-zero values of a column of the shard input matrix multiplied with one or more respective values of the shard input vector.

The plurality of adder circuits form a parallel segmented sum circuit, and wherein each of the one or more segmented sums are sums of outputs to adjacent adder circuits not gated by a segment marker.

The crossbar circuit is a first crossbar circuit; and wherein the sparse shard further includes a second crossbar circuit configured to: receive the one or more segmented sums, and arrange, according to the one or more control values, the one or more segmented sums to generate the respective shard output vector for the sparse shard.

The second crossbar circuit can form a Beneš network and wherein the shard input matrix is a square matrix.

Another aspect of the disclosure provides for a system including one or more processors; and one or more memory devices storing instructions that when executed by the one or more processors, cause the one or more processors to perform operations including: receiving an input matrix including zero and non-zero values; and partitioning the input matrix into a plurality of sub-matrices, wherein the number of non-zero values for each sub-matrix is equal to or less than a predetermined maximum non-zero threshold, and wherein the dimensions for each sub-matrix are equal to or less than predetermined dimension thresholds.

The operations can further include generating, for each sub-matrix, one or more respective control values specifying positions of non-zero values along each column of the sub-matrix.

The operations can further include: sending each sub-matrix and the one or more respective control values for each sub-matrix to a plurality of sparse shards configured to process each sub-matrix and respective control values for the sub-matrix.

Each of the plurality of sparse shards are configured to: receive a sub-matrix, the one or more respective control values for the sub-matrix, and at least a portion of an input vector, and generate a respective output shard vector representing the product of the sub-matrix and the portion of the input vector.

Other aspects of the disclosure include corresponding systems, apparatuses, and computer programs stored on one or more non-transitory computer readable storage media.

BRIEF DESCRIPTION OF THE DRAWINGS

FIG. 3A is an illustration of an example shard input matrix for a sparse shard.

FIG. 3B is an illustration of a vector of non-zero values of the example shard input matrix.

FIG. 3C is an illustration of vectors of control values for the example shard input matrix.

FIG. 7A is an illustration of an example system input matrix and a system input vector.

DETAILED DESCRIPTION

Overview

Figure 1:
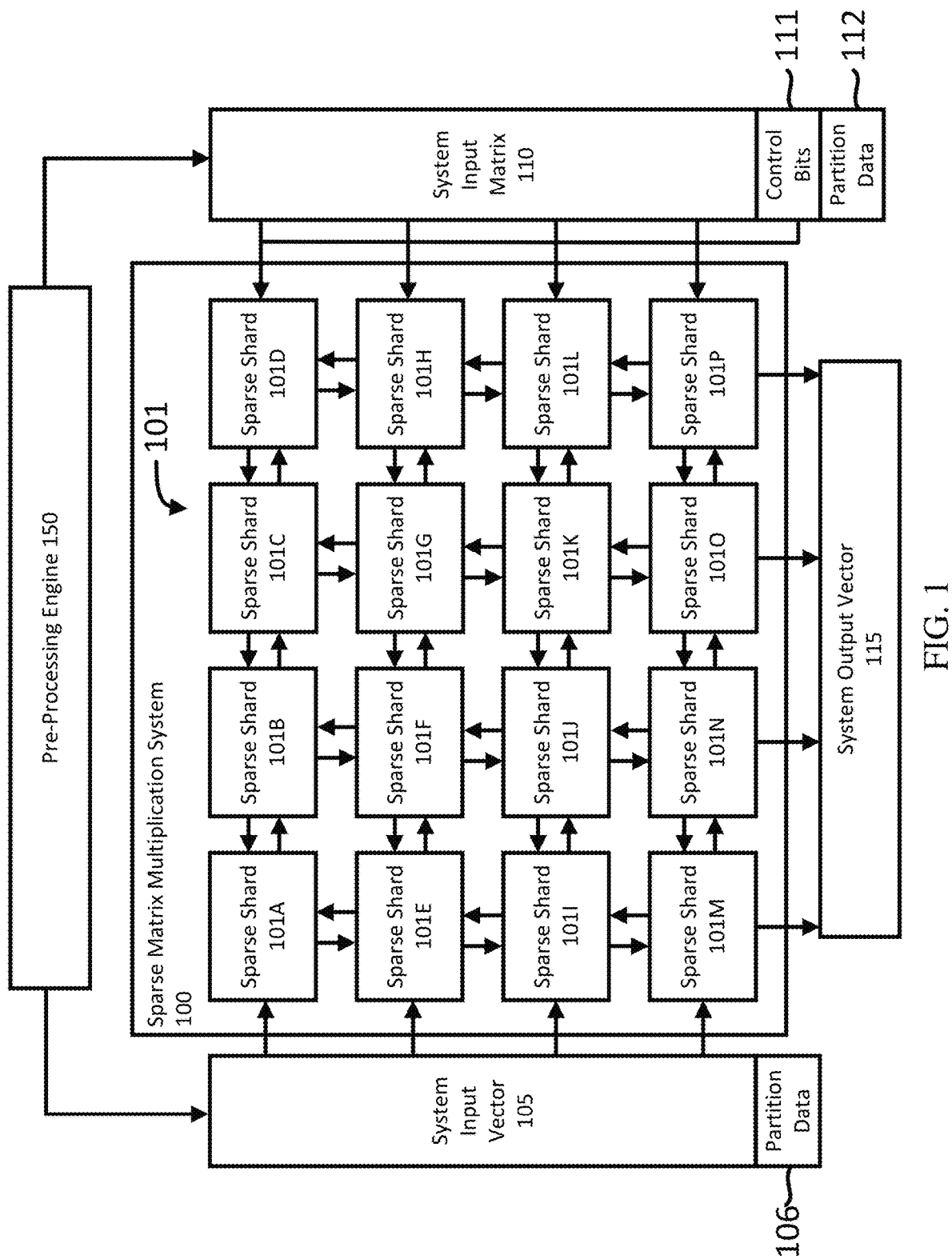
FIG. 1 is a block diagram of an example system including an array of sparse shards, according to aspects of the disclosure.

Aspects of the disclosure are directed to a system including one or more integrated circuits configured for sparse matrix dense vector multiplication. A system of multiple sparse shards can receive, for each sparse shard, a sub-matrix and a sub-vector of an input system matrix and vector. Each sparse shard can be at least part of an integrated circuit and implement a number of arithmetic units, such as multiplier and adder circuits. Each sparse shard is configured to receive a sub-matrix with a number of non-zero values equal to or less than a maximum non-zero threshold, which can be predetermined when the system is implemented, for example as a chip including the sparse shards and optionally one or more other components as described herein.

Each sparse shard can additionally receive metadata, such as the control values described herein, which the sparse shard can use to direct different inputs to each multiplier or adder circuit, and to gate when output from one unit is passed to another. By configuring the sparse shards according to received metadata, the sparse shards can efficiently process arbitrarily-sized input sub-matrices up to a predetermined dimension threshold, and output products as vectors of corresponding lengths to the inputs.

As part of receiving the sub-matrix, each sparse shard can receive one or more control values, which represent the positions of the non-zero values at each column in the sub-matrix. With the one or more control values, the sparse shard can be configured to adjust how individual values of the sub-matrix and sub-vector are multiplied, added, and arranged to cause the sparse shard to generate a shard output vector representing the product of the sub-matrix and the sub-vector. The system can be further configured to generate, from the shard output vector of each shard, a system output vector representing the product of applying the system input vector to the system input matrix, for example by multiplying the system input vector with the system input matrix.

Aspects of the disclosure are also directed to systems for pre-processing a sparse matrix for processing by an array of sparse shards. A system of one or more processors can be configured to partition an input matrix into multiple sub-matrices, in which dimensions of each sub-matrix are equal to or less than predetermined dimension thresholds specifying a maximum matrix input size for a sparse shard. As part of the partitioning, the system can identify whether any of the sub-matrices include a number of non-zero values greater than the predetermined maximum non-zero threshold, and in response, re-partition sub-matrices along the same row or column as the identified sub-matrices. The system can repeat this process until generating a sub-matrix for each sparse shard, such that the dimensions for the sub-matrix are within the dimension thresholds, and the number of non-zero values in the sub-matrix is less than or equal to the predetermined non-zero threshold.

Systems implemented according to aspects of the disclosure can more efficiently execute workloads that involve repeated multiplication of sparse matrices with vectors. For example, a device implementing a system-on-a-chip (SoC) according to aspects of the disclosure can generate products of sparse matrices multiplied with vectors in fewer processing cycles over conventional approaches, at least because the device omits redundant "multiply by zero" calculations of zero elements in the matrices, which do not contribute to the final product. While other approaches can experience increasing performance losses for larger matrices having higher sparsity ratios, a system implemented as described herein can calculate products using these matrices even more efficiently, at least because a higher proportion of redundant calculations are omitted as the sparsity ratios of input matrices increases.

Some workloads, such as executing or training neural networks, rely heavily on performing matrix multiplications. Hardware accelerators or other devices can efficiently perform certain operations, such as matrix multiplication, but often have restrictive conditions for processing. For example, a device may require a predefined sparsity ratio between zero and non-zero values of a matrix, or have a strict limitation on the size of inputs to process. While matrix multiplication is a ubiquitous type of calculation for many neural network workloads, accelerators with restrictive conditions for processing are limited in the number of types of workloads that can be supported by the accelerators, such as workloads involving matrix multiplication of matrices with varying sparsity ratios.

Aspects of the disclosure provide for a system for sparse matrix multiplication that can flexibly process matrices of different sizes and sparsity ratios. A sparse shard of a system of sparse shards configured for sparse matrix multiplication can discard zero values of an input matrix while still tracking the position of non-zero values in a given input sub-matrix across multiple columns. The sparse shard can be configured with only as many registers and multiplier circuits as a predetermined maximum non-zero threshold, and store only the non-zero values of an input sub-matrix in memory. As a result, the sparse shard can store and process input data more efficiently and with fewer resources versus storing the full-sized matrix.

Further, the sparse shard can be configured to arrange non-zero values and their products when multiplied with values of an input vector along adjacent multiplier and adder circuits, respectively. The sparse shard can be configured to efficiently generate segmented sums for each column of an input matrix by combining output of these adjacent circuits, and rearrange the segmented sums to generate a shard output vector. The sparse shard can preserve the order of non-zero values to accurately add and multiply the values with corresponding values of an input vector, and accurately generate the shard output vector as the product of the input sub-matrix and the input vector. The sparse shard can perform multiplication on an input matrix without requiring pre-processing operations to change the shape of the input matrix.

The system can also include one or more processors configured for pre-processing a sparse matrix for multiplying with an input vector by the multiple sparse shards. The system can support different configurations of sparse shards, including generating different numbers of sub-matrices depending on the number of available sparse shards, as well as generating sub-matrices for different maximum non-zero thresholds.

Aspects of the disclosure as described herein can be implemented by a system including one or more processors and multiple sparse shards. The system can be implemented, for example, as a chip installed on a computing device, such as a server computing device in a datacenter of a computing platform.

Example Systems

FIG. 1 is a block diagram of an example system 100 including an array 101 of sparse shards 101A-P. The array 101 can be at least part of a sparse matrix multiplication system, such as the sparse matrix multiplication system 100, configured to perform matrix multiplication on matrix inputs.

Figure 2:
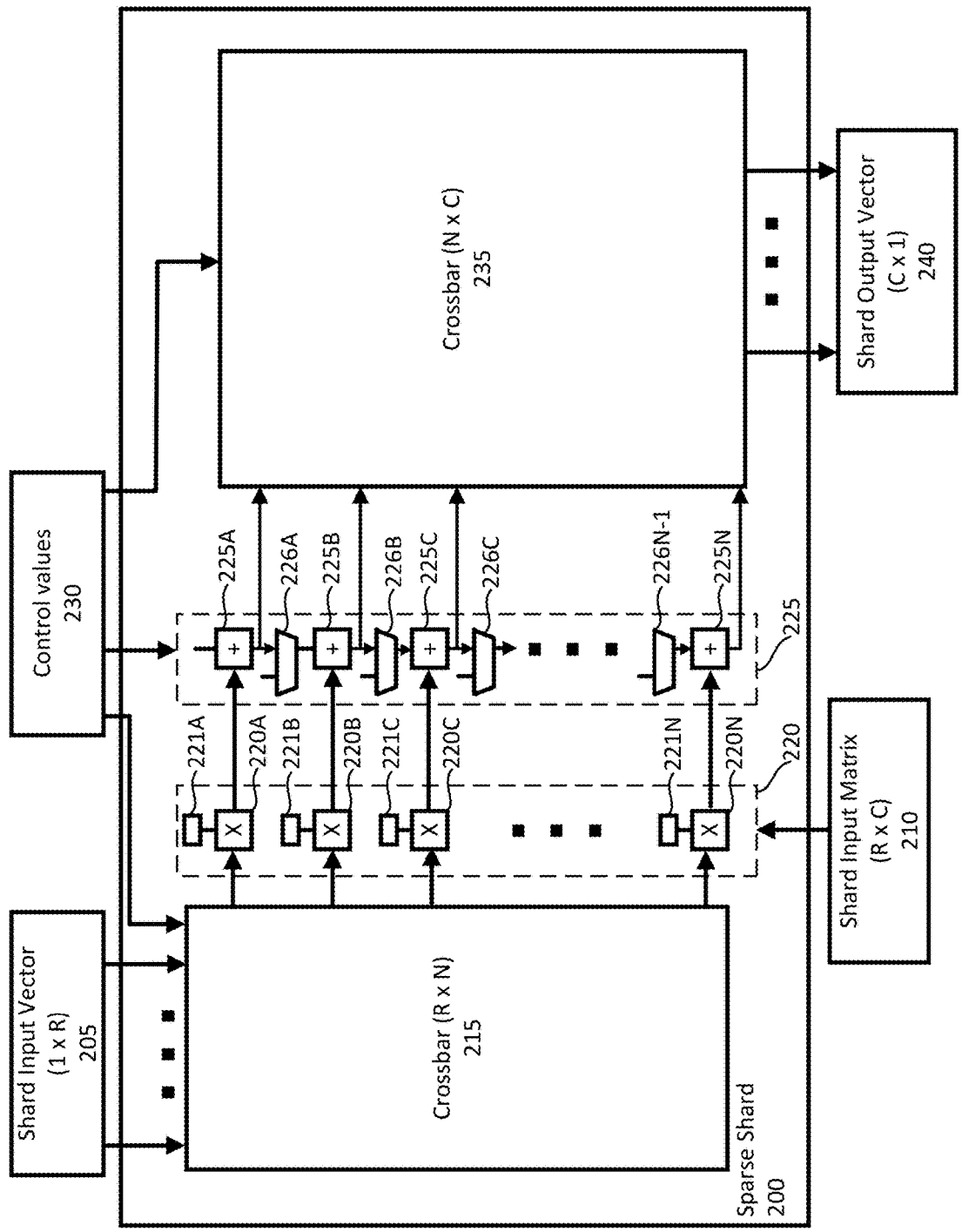
FIG. 2 is a block diagram of an example sparse shard, according to aspects of the disclosure.

As described in more detail herein with reference to FIG. 2, a sparse shard is a collection of circuits configured for performing arithmetic operations, arranging inputs and outputs between circuits performing arithmetic operations, and/or gating input and output between other circuits. For example, a sparse shard can be configured to perform a matrix multiplication between a rectangular shard or portions of a sparse matrix, and a linear shard or piece of a vector. As described in more detail herein, the sparse shard can receive any of a variety of different shards or portions of a sparse matrix, with any number of non-zero values in the shard or portion, up to a predetermined maximum threshold.

The collection of circuits can be configured as described herein to control: the state of each gate (i.e., open or closed); the operands that are calculated; and/or the arrangement of inputs and outputs to and from each circuit. The configuration can depend at least in part on the dimensions of a shard input matrix that the sparse shard is configured to receive as input, and/or on the arrangement and number of non-zero values in the shard input matrix. Each sparse shard can be an individual circuit component to a system that is configured to multiply a sparse matrix with a vector.

Each sparse shard 101A-P is configured to communicate with two or more other sparse shards in the array 101. A sparse shard can communicate with its immediate neighbors, e.g., neighbors coming immediately before or after the sparse shard along a dimension defined by a rectangular arrangement of the sparse shards 101A-P. The connection between sparse shards can be implemented, for example, through a bus or one or more circuit interconnects physically connecting a sparse shard to its neighbors. Each sparse shard 101A-P can be implemented as one or more circuits configured for receiving at least a portion of a matrix and at least a portion of a vector, and generating an output vector representing the product of multiplying the input matrix and vector. In some examples, the sparse shards 101A-P are organized as a systolic array, although in various implementations the array 101 is generally configured or arranged according to a rectangular arrangement of the sparse shards 101A-P.

The array 101 can be at least part of a system-on-a-chip implementing a number of components and integrated circuits on a circuit board or other material. The array 101 can be installed as part of a computing device and be configured to interact with other components of the device, including memory, processors, network components, and/or peripherals. For example, the array 101 can receive a system input vector 105 and a system input matrix 110 from one or more memory devices implemented as part of the system 100. The system 100 can generate, as output, a system output vector 115 representing the product of multiplying the system input vector 105 and the system input matrix 110.

In some examples, the system output vector 115 can be fed as input to other devices or components of a device implementing the system 100. For example, if the system output vector 115 is the product of multiplying model parameter values with some vector input for a neural network, then the system output vector 115 can be fed as input to one or more processors configured to compute an activation function for the output vector 115.

The system 100 can receive the system input vector 105 and the system input matrix 110 from a pre-processing engine 150. The pre-processing engine 150 can be implemented on one or more computing devices, which may or may not be devices implementing the system 100. The system input matrix 110 can include values representing at least a portion of model parameter values for a neural network, as an example. The system input matrix 110 can be a portion of a more complex data structure, such as a multi-dimensional array or tensor. The system 100 can be configured to receive each matrix corresponding to at least a portion of a larger data structure, such as a three-dimensional tensor or matrix, and generate a corresponding output when multiplied with the system input vector 105. The system input vector 105 can be, for example, an input to a trained neural network whose model parameter values are represented at least partially by values for the system input matrix 110.

The pre-processing engine 150 can be configured to process the system input matrix 110 to generate one or more control values 111 and matrix partition data 112. The pre-processing engine 150 can receive the system input matrix 110 in a variety of different formats for storing a sparse matrix, for example in its complete row-column form (with all non-zero and zero values). As other examples, the pre-processing engine 150 can receive the system input matrix 110 according to a compressed sparse column format, a coordinate list format, or any of a variety of other formats for storing sparse matrices.

In some examples in which the pre-processing engine 150 receives the system input matrix 110 in its complete form, the pre-processing engine 150 is configured to convert the system input matrix 110 into a format predetermined to be suitable for storing in memory. For example, the pre-processing engine 150 can remove zero values from a matrix and generate control values for tracking the position of non-zero values relative to its original position in a matrix, before converting to the predetermined format.

The control values, as described in more detail herein with reference to FIG. 2, are used to configure each sparse shard for receiving and multiplying a sub-vector of the system input vector 105 with a sub-matrix of the system input matrix 110. The partition data 112 is data specifying how the system input matrix 110 should be partitioned into sub-matrices. Each sub-matrix is received as input at a respective sparse shard, and the partition data 112 specifies a partitioning for as many sub-matrices as sparse shards in the array 101.

The pre-processing engine 150 can be configured to generate vector partition data 106. As described in more detail with reference to FIGS. 5A-C, sparse shards along the same row or column can receive the same sub-vector as input for multiplying with a respective sub-matrix.

Although the system input matrix 110 and the system input vector 105 are shown as being fed along the left and right sides of the system 100, the exact positioning and orientation of the buses feeding input data to the system 100 can vary from implementation-to-implementation. For example, based on the position of other components on the same chip as the system 100, buses or circuit interconnects for feeding input and receiving output to and from the system 100 may be oriented or positioned differently to account for the position of those other components.

FIG. 2 is a block diagram of an example sparse shard 200, according to aspects of the disclosure. For example, the sparse shards 101A-P of the system 100 can each be implemented as described herein with reference to the sparse shard 200.

The sparse shard 200 is configured to receive a shard input vector 205 and a shard input matrix 210. The shard input vector 205 includes one or more vector values and can have a maximum dimension of 1×R. The shard input matrix includes one or more zero values and one or more non-zero values and has a maximum dimension of R×C. R (row) and C (column) are dimension thresholds that are predetermined and correspond to the maximum input size of a vector/matrix that the sparse shard that can be received as input. In different implementations, the sparse shard can be configured for different dimensions R and C. R and C may be equal or different from one another, and different sparse shards can be implemented for different dimensions, for example in response to the nature of data of different workloads the sparse shard is configured to process. Sparse shards of an array of sparse shards can be configured to receive input within the same maximum dimension threshold.

The sparse shard 200 can be configured to receive the shard input vector 205 and the shard input matrix 210 within predetermined address ranges in memory associated with the sparse shard 200. For example, the sparse shard 200 is configured to automatically retrieve the shard input vector 205 from a first address range in coupled memory, and to retrieve the shard input matrix 210 from the same or different address range in memory. Devices or components of the device implementing the system 100 having the sparse shard 200 can be configured to send shard input matrices and vectors to locations in memory corresponding to each of one or more sparse shards implemented by the system. For example, the pre-processing engine 150, after generating processing a system input matrix and/or a system input vector, can be configured to cause individual shard input matrices and shard input vectors to be stored at address ranges corresponding to each sparse shard, including the sparse shard 200.

In addition to the maximum dimension threshold, the sparse shard 200 is configured to receive shard input matrices with a non-zero count equal to or less than a predetermined maximum non-zero threshold. Like the dimension threshold, the maximum non-zero threshold can be set for different values from implementation-to-implementation of the sparse shard 200 and its corresponding array. For example, if data for a workload a system is configured to process generally includes processing matrices with a high sparsity ratio, the system of sparse shards can be configured with a relatively higher maximum non-zero threshold. As described herein, the number of multiplier and adder circuits of a sparse shard corresponds to its maximum non-zero threshold, therefore sparse shards with relatively low maximum non-zero thresholds can be built with fewer circuits relative to sparse shards with higher maximum non-zero thresholds.

The sparse shard 200 can include a crossbar 215 and multiplier circuits 220. The crossbar 215 is configured to receive a maximum of R vector values and distribute the values across N multiplier circuits 220, where N is equal to the maximum non-zero threshold for the sparse shard 200. Multiplier circuits 220A-C, N are shown but it is understood that in different implementations the sparse shard 200 can include more or fewer multiplier circuits.

The crossbar 215 can be implemented as any circuit or circuits configured to receive input and pass that input to one or more destinations, which themselves can be other circuits such as the multiplier circuits 220. The multiplier circuits 220 can be implemented according to any of a variety of different techniques for performing hardware multiplication between two operands. The first operand for a multiplier circuit can be a vector value received by the crossbar 215. The second operand for the multiplier circuit can be a non-zero value from the shard input matrix 210. Each non-zero value is loaded into a respective register 221A-C, N of a respective multiplier circuit 220A-C, N. Having as many multiplier circuits as the maximum non-zero threshold provides for an available multiplier circuit for each shard input matrix within the non-zero threshold. Each multiplier circuit multiplies the non-zero value stored in its respective register with a vector value received by the crossbar 215.

The sparse shard 200 can also include adder circuits 225. Each adder circuit 225A-C, N is configured to receive input from a corresponding multiplier circuit. In between each adder circuit is a segment marker. Adder circuits 225A-C, N and segment markers 226A-C, N–1 are shown in FIG. 2, but as with the multiplier circuits 220, it is understood that the number of adder circuits and segment markers can vary from implementation-to-implementation.

An adder circuit can be implemented using any technique for hardware addition of two operands. The first operand from an adder circuit can be a product received from a multiplier circuit. For example, the multiplier circuit 220A passes the product of multiplying a vector value and a non-zero value to the adder circuit 225A. A segment marker is a circuit or other hardware component configured to gate input between adjacent adder circuits, depending on a gate input value.

Figure 4:
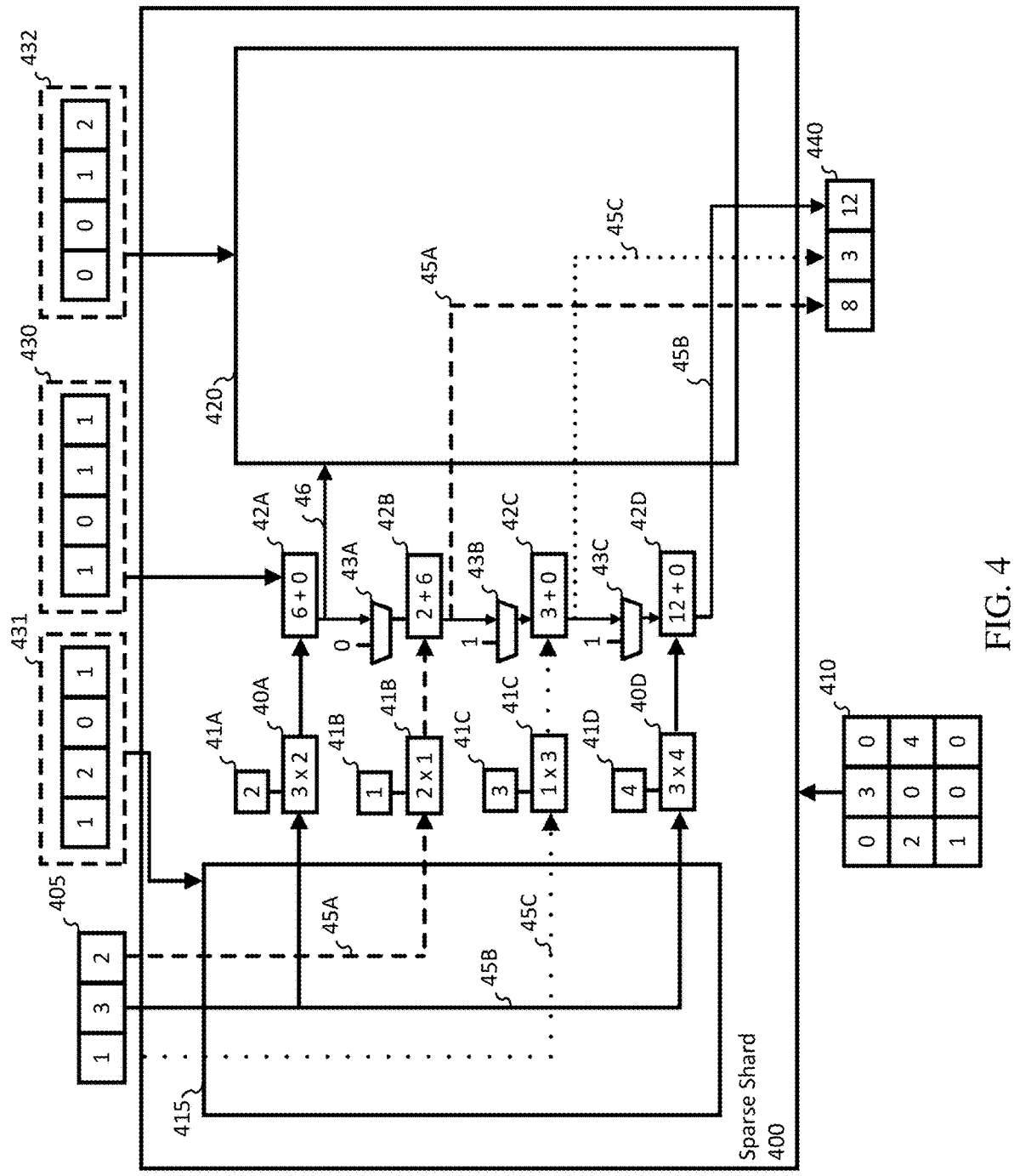
FIG. 4 illustrates an example matrix multiplication by a sparse shard receiving a shard input matrix, a shard input vector, and control values for the shard input matrix.

Control values 230 can be received as input along with the shard input matrix 210 and shard input vector 205, and be used to configure one or more of the crossbar 215, segment markers 226, and/or the crossbar 235. The control values 230 can be a sequence of values each corresponding to a respective non-zero value in the shard input matrix 210. The control values 230 can include values of a first type, such as 1, which can correspond to non-zero values that are the first non-zero value of its respective column in the shard input matrix. The control values 230 can include values of a second type, such as 0, which can correspond to non-zero values that are preceded by one or more other non-zero values in the same column of the shard input matrix. The control values 230, as described herein with reference to FIGS. 3A-C, can also include one or more vectors of values that as described herein can be used to configure the sparse shard for processing the shard input matrix 210 and the shard input vector 205. FIG. 4 and its corresponding description herein illustrate an example matrix multiplication using a sparse shard.

In some implementations, the crossbars 215, 235 can be implemented to take advantage of different maximum dimension thresholds for the sparse shard 200. For example, when the dimensions R and C are equal or approximately equal, then the crossbar 235 can be implemented according to any technique for crossbar rearrangement on square or approximately square inputs, for example as a Beneš network.

Figures 3A, 3B, 3C:
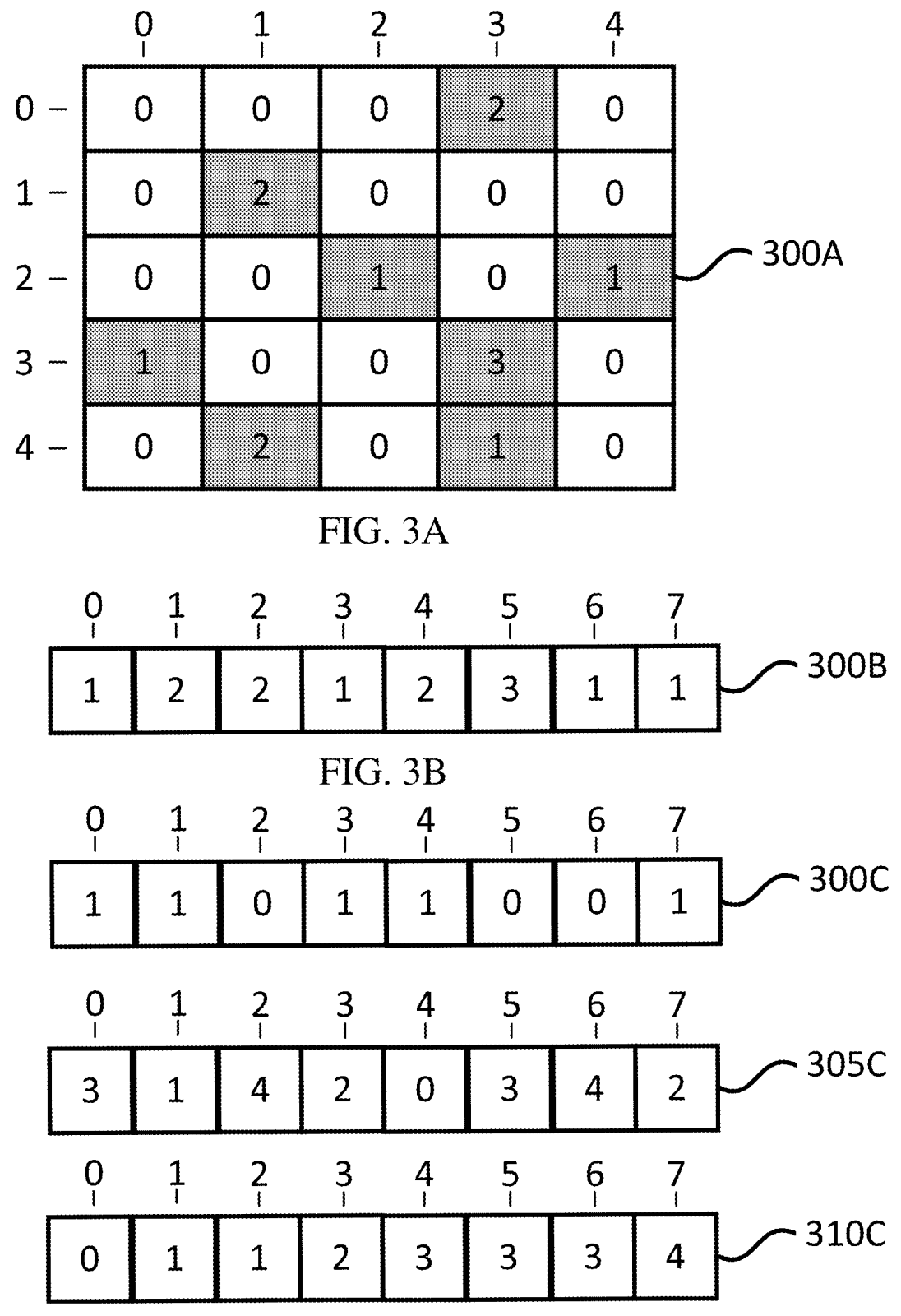

FIGS. 3A-C illustrate an example shard input matrix 300A, a vector of non-zero values 300B in the shard input matrix, and a vector of control values 300C corresponding to the shard input matrix 700A. FIG. 3C also shows additional control vectors 305C and 310C.

FIG. 3A is an illustration of an example shard input matrix 300A for a sparse shard. Non-zero values are shown as shaded cells, for clarity. Indices are provided for clarity along the columns and rows of the shard input matrix 300A, and along the vectors 300B and C. For example, in the matrix 300A, the value at row 2, column 4 (2,4) is 1.

FIG. 3B is an illustration of a vector 300B of non-zero values of the example shard input matrix 300A. The non-zero values in the vector 300B correspond to the order of appearance of non-zero values in the shard input matrix 300A when read from left-to-right, though the exact read order can vary from implementation-to-implementation, for example right-to-left.

FIG. 3C is an illustration of vectors 300C, 305C, and 310C of control values for the example shard input matrix 300A. In some examples, the vectors 300C, 305C, and 310C can be part of the same vector according to a predetermined order, which a sparse shard can be configured to use in receiving the vector of control values and configuring different components of the sparse shard according to the vectors 300C, 305C, and 310C, as described herein.

Vector 300C corresponds to control values used for configuring the segment markers of a sparse shard. A control value (in this example a bit) value of 1 in vector 300C corresponds to the start of a new column in the matrix 300A. The value at index 0 can be automatically set to 1, as the start of the vector 300C of control values. In some implementations, the starting control value can be omitted and assumed as a constant by a processing sparse shard. Hardware implementations may simplify their circuitry by taking advantage of the fact that this value is known to be 1. The value at index 1 in the vector 300C is also set to 1, to correspond with the value at index 1 in the vector 300B, which is the first non-zero value in the next column of the matrix 300A. The value at index 2 in the vector 300C is set to 0, as it corresponds to a non-zero value in vector 300B that is not the first non-zero value in the next column.

As another example, the bit at index 3 in the vector 300C is set to 1, because the corresponding non-zero value (the value 1 in index 3 of the vector 300B) is the first non-zero value of the next column in the matrix 300A (specifically, column 2). The sequence in the vector 300C follows this described pattern until all non-zero values in all columns are represented.

Vector 305C corresponds to control values for configuring an input crossbar for the sparse shard. The vector 305C specifies, for each non-zero value in the shard input matrix 300A, the "y"-coordinate of the non-zero value within the sub-matrix 300A. In this example, the "y"-dimension goes up and down the sparse matrix 300A vertically, although in other examples the "y"-dimension can be defined differently, e.g., defined horizontally. For example, the value "3" at element zero in the vector 305C corresponds to the "y"-coordinate of the non-zero value "1" in the first column of the matrix 300A. As another example, the value "4" at element six in the vector 305C corresponds to the value "1" at the bottom of the fourth column of the matrix 300A.

Vector 310C corresponds to control values for configuring how sums generated by the adder circuits of the sparse shard are arranged by the output crossbar to generate a shard output vector.

By the mathematical definition of matrix multiplication, each value at position (x,y) in the sparse matrix is multiplied by a value in the input vector at position y. The result of the multiplication is added to output at position x. The input crossbar uses the vector 305C to arrange non-zero values of the same column to adjacent multiplier circuits in the sparse shard. The output crossbar uses the vector 310C to arrange the computed sums in the correct order in the shard output vector, representing the product of multiplying the shard input matrix and the shard input vector by the sparse shard.

Returning to FIG. 2, the crossbar 215 can be configured to receive the control values 230 and arrange each value for the shard input vector 205 to be received as input to one or more multiplier circuits matching the corresponding shard input matrix column when the shard input vector is multiplied with the shard input matrix.

The crossbar 235 can be configured to receive one or more sums from the adder circuits and rearrange received sums to obtain the correct output shard vector corresponding to multiplying the input shard matrix with the input shard vector. As with the crossbar 215, any of a variety of different techniques can be applied for implementing the crossbar 235 as one or more circuits.

As described herein, a segment marker is configured to gate input between adjacent adder circuits depending on the gate input value of the segment marker. For example, when the segment marker receives a control value with a value of 1, then the segment marker can prevent output from a first adder circuit adjacent to the segment marker from being passed as input to a second adder circuit adjacent to the segment marker. When the segment marker receives a control value with a value of 0, then the segment marker passes output from the first adder circuit to the second adder circuit (or vice-versa, in some implementations). This configuration of the segment marker corresponds to adding only sums corresponding to non-zero values of the same column, separate from sums of non-zero values of different columns. As described herein with reference to FIG. 2, the one or more sums can be passed to the crossbar 235 and rearranged to generate a shard output vector 240.

The crossbar 235 can be configured to determine whether to discard input or receive the input and rearrange the input to match its correct position in the shard output vector 240. As shown in FIG. 2, each adder circuit can pass output to the crossbar 235 (shown by arrows to the crossbar 235). If the next segment marker after an adder circuit is not gated, then the crossbar 235 can discard the output to that adder circuit, because the running sum between adjacent adder circuits has not ended. If the next segment marker is gated (or if there is no segment marker, in the case of the last adder circuit 225N), then the running sum for the column has finished, and the crossbar 235 receives the running sum as input to be part of the output shard vector 240. By keeping track of which sums to ignore and which sums to include as part of the shard output vector 240, the crossbar 235 can accurately track column sums to generate output vectors of varying lengths, up to the maximum dimension C.

FIG. 4 illustrates an example computation of a sparse shard 400 receiving a shard input matrix 410, a shard input vector 405, and control values 430 for the shard input matrix 410.

Consider example values for the shard input vector 405 and the shard input matrix 410:

[1 3 2] (vector 405) [0 3 0 2 0 4 1 0 0] (matrix 410).

The corresponding control vectors 430-432 for the matrix 410 in this example are:

[1 0 1 1] (control vector 430)
[1 2 0 1] (control vector 431)
[0 0 1 2] (control vector 432)

For ease of description, multiplier circuits 40A-D will be shortened to multipliers A-D, segment markers 43A-C will be shortened to segment markers A-C, and adder circuits 42A-D will be shortened to adders A-D.

Multiplier A is loaded with the value 2, multiplier B is loaded with the value 1, multiplier C is loaded with the value 3, and multiplier D is loaded with the value 4, based on the non-zero values for the matrix 410. Note, for this example, the sparse shard includes only four multipliers A-D and four adders A-D.

Crossbar 415 receives the vector 405 with vector values 1, 3, and 2. Dashed line 45A, solid line 45B, and dotted line 45C are shown to illustrate the path of data from the shard input vector 405 to shard output vector 440. The crossbar 415 receives control vector 431, each value in the control vector 431 corresponding to an "y"-coordinate of a respective non-zero value in the shard input matrix 410. The values in the control vector 431 include 1, 2, 0, and 1. Note that the values of the "y"-coordinates range from 0 to 2, because the sparse input matrix 410 has a dimension 3×3. The control vector 431 specifies, for each of the multipliers A-D, which of the values in the shard input vector 405 should be sent to which multiplier.

For example, the first value in the control vector 431 is 1, corresponding to the "y"-coordinate of the first non-zero value in the shard input matrix 410. Because the "y"-coordinate 1 is the second coordinate (after zero), the crossbar 415 routes the second value of the shard input vector 405 to the first multiplier, here Multiplier A. The second value for the control vector 431 is 2, corresponding to the "y"-coordinate of the second non-zero value in the shard input matrix 410. The crossbar 405 can be configured to then route the third value of the shard input vector 405 to the Multiplier B. As another example, the third value in the control vector 431 is 0, corresponding to the next non-zero value having a "y"-coordinate of 0. The crossbar 415 routes the first value of the shard input vector 405 to the Multiplier C.

For the first column of the matrix 410, the crossbar 415 routes the value 3 to the multiplier A, and the value 2 to the multiplier B. For the second column of the matrix 410, the crossbar 415 routes the value 1 to the multiplier C. For the third and last column of the matrix 410, the crossbar 415 routes the value 3 to the multiplier D. The products for the multipliers A-D are as follows: 6 (3×2) for multiplier A, 2 (2×1) for multiplier B, 3 (1×3) for multiplier C, and 12 (3×4) for multiplier D.

Next, the adders A-D receive the products calculated by the multipliers A-D. Adder A receives the product from multiplier A, which is 6. The first control value (1) is discarded. Adder A has no adder before it, so it passes the sum to segment marker A. Segment marker A is not gated, because the second value of the control values 430 is zero. Adder B receives the current sum from the adder A (6) and adds it to the product of multiplier B (2). Segment marker B is gated, so the output (8) of the adder B is passed to the crossbar 420 (indicated by the dashed line 45A). Adder C adds the product of multiplier C (3) with nothing, as the segment marker B gates output from the adder B. Segment marker C is gated, so the output of the adder C (3) is passed to the crossbar 420 (indicated by the dotted line 45C). Lastly, multiplier D receives the product of multiplier D (12), and because it is the last adder in the sparse shard, automatically passes its output (12) to the crossbar 420 (indicated by the solid line 45B).

The crossbar 420 rearranges the received sums 8, 3, and 12, according to the correct order for outputting the output shard vector 440. The crossbar 420 receives control vector 432, having values 0, 0, 2, and 1. As described herein with reference to FIGS. 3A-C, the values of the control vector for the output crossbar 420 correspond to "x"-coordinate locations of non-zero values. Like the "y"-coordinates, the values range from 0 to 2, in this example. The first two values of the control vector 432 are 0. The crossbar 420 therefore routes the first sum received to the first element of the output shard vector 440. The next value following the zeros in the crossbar 432 is 2. The crossbar 432 is configured to route the second sum received from the Adders A-D to the second element of the output vector 440 (as shown by the line 45C) and the third sum to the third element (as shown by the line 45B). In some examples, the crossbar 420 is configured to skip over consecutive duplicate control values in the vector 432, for example as shown in the vector 432 with the first two zeros. In some examples, instead of skipping consecutive duplicate control values, the crossbar 420 is configured to perform an inclusive OR operation on input sums received, and output the result of the inclusive OR operation to the position of the output vector 440 corresponding to the consecutive duplicate control values.

For example, line 46 shows a potential input source of the adder A to the output crossbar 420. Because the segment marker 43A has a value of zero, the output of the adder A to the crossbar 420 is suppressed, e.g., masked or set to zero. The output of the adder A instead passes through the segment marker 43A to the adder B. In some examples, when the output crossbar 420 receives the control values 432, the output crossbar 420 performs an inclusive OR operation on the first sum received (through line 46, with a value of zero) and the second sum received (through line 45A, with a value of 8 from the adder B). The crossbar 420 can be configured to perform an inclusive OR operation so as to output a non-zero operand. The crossbar 420 will output 8 after performing an inclusive OR operation on the received sums (e.g., 0 OR 8), and pass the result to the first position in the output vector 440. In some examples, the output crossbar 420 can receive and sum individual outputs from at least some of the adders A-D.

Adder circuits can be implemented according to any of a variety of different circuit configurations for adding consecutive ranges of numbers defining segments, each segment corresponding to values within a respective column of a shard input matrix processed by a corresponding sparse shard. For example, the adder circuits of sparse shard 200 or 400 can be implemented as one or more sequential segmented summation circuits (for example, as shown by sparse shard 200 or 400), for performing sequential segmented summation of products by multiplying non-zero values in each column with respective values in the shard input vector. In some implementations, the adder circuits can be configured to execute a summation tree as a parallel segmented summation circuit. The individual adder circuits can be configured to add corresponding inputs in parallel, and pass their sums to the output crossbar and/or adjacent adder circuits, according to the gate value of any intervening segment markers, as described herein.

A parallel segmented summation circuit can reduce the circuit's latency relative to the sequential segmented summation circuit, especially when the number of terms being summed is large. The control values for gating the segment markers allow for parallel segmented summation, at least because the ranges of values to be summed together can be tracked according to gate values for segment markers that gate input between adder circuits corresponding to values in different segments, and allow input between adder circuits corresponding to values to be added in the same segment.

In some implementations, the output crossbar 420 is configured to receive individual sums computed by each adder, and add and route the sums to the corresponding element of the output shard vector 440, using the control vector 432. If two or more sums are routed to the same element, e.g., the control vector 432 includes duplicates of the same value as with the first zeros in the vector 432, then the output crossbar is configured to add each received sum to be routed to the same element in the output shard vector 440, instead of receiving a single sum as shown by line 45A in FIG. 4.

Example Methods

Figure 5:
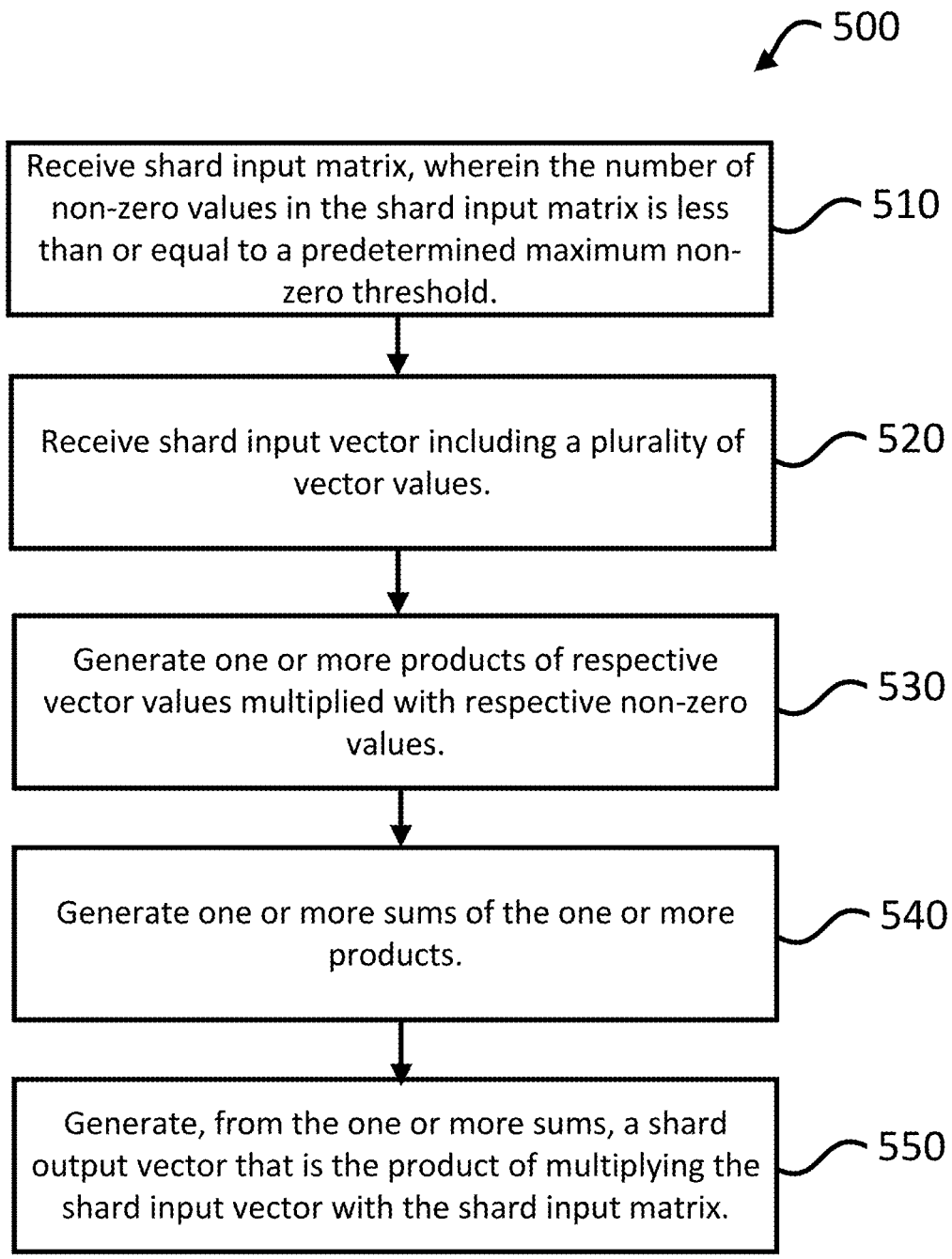
FIG. 5 is a flow diagram of an example process for multiplication of a sub-matrix of a sparse matrix on a sparse shard with a system input vector, according to aspects of the disclosure.
Figure 9:
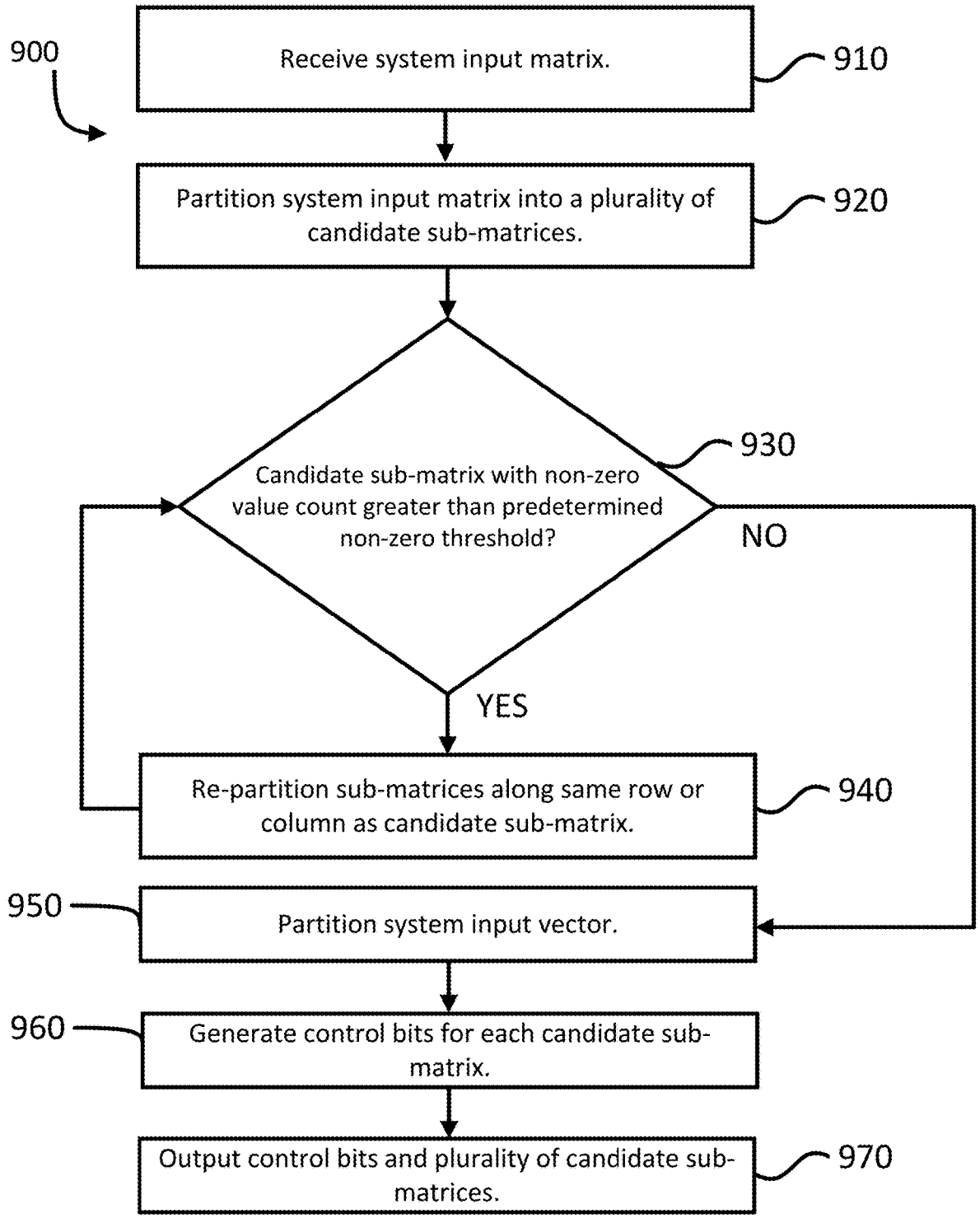
FIG. 9 is a flow diagram of an example process for generating sub-matrices from a system input matrix, according to aspects of the disclosure.

FIG. 5 is a flow diagram of an example process 500 for multiplication of a sub-matrix of a sparse matrix on a sparse shard with a system input vector, according to aspects of the disclosure. For ease of description, the sub-matrix of the sparse matrix is referred to as a shard input matrix. FIG. 9, herein describes an example process for partitioning an input sparse matrix into multiple sub-matrices. For example, a sparse shard, such as the sparse shard 200 of FIG. 2, and perform the process 500.

The sparse shard receives a shard input matrix, according to block 510. The shard input matrix is within a predetermined dimension threshold, and has a non-zero value count equal to or less than the predetermined maximum non-zero threshold.

The sparse shard receives a shard input vector including a plurality of vector values, according to block 520. The shard input vector is a sub-vector of a system input vector, which can be generated as part of pre-processing input for the system by a pre-processing engine, as described herein with reference to FIGS. 1 and 9.

Figure 8A:
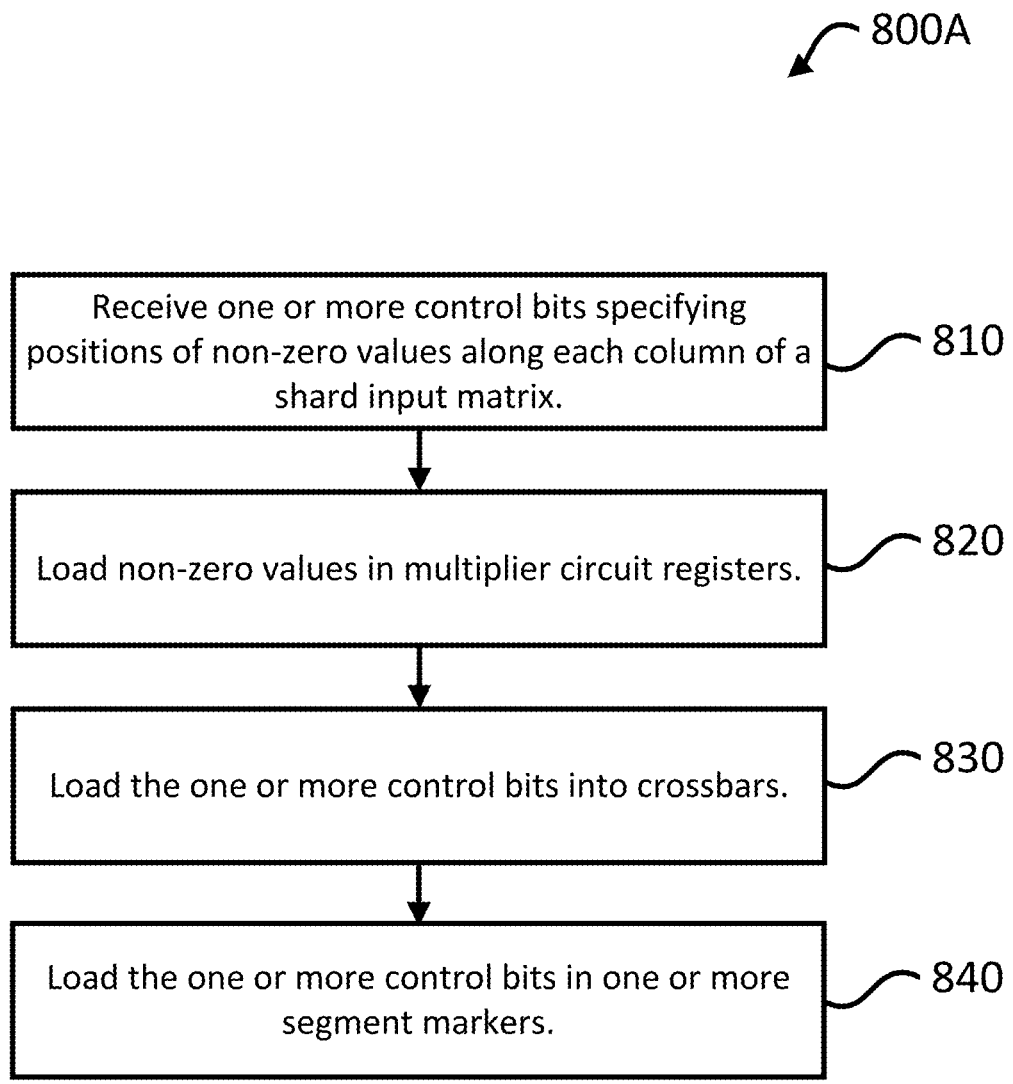
FIG. 8A is a flow diagram of an example process for configuring a sparse shard using one or more control values of a shard input matrix, according to aspects of the disclosure.

The sparse shard generates one or more products of respective vector values multiplied with respective non-zero values, according to block 530. As described herein with reference to FIGS. 2 and 4, the sparse shard can be configured with control values corresponding to positions of non-zero values in a shard input matrix. Based on the control values, the sparse shard can be configured to route incoming vector values of a sub-vector to corresponding adjacent multiplier circuits, stored with non-zero values along the same column of the input shard matrix. FIG. 8A, described herein, shows an example process for configuring the sparse shard using control values for a shard input matrix.

The sparse shard generates one or more sums of the one or more products, according to block 540. As described herein with reference to FIG. 2, the sparse shard includes multiple adder circuits that are configured to receive input from a corresponding multiplier circuit. The adder circuits are further configured to add these inputs along adjacent adder circuits, until reaching a segment marker set to gate circuits adjacent to the marker. The sum of adder circuit inputs up to the segment marker can be passed to a crossbar, for example the crossbar 235 of FIG. 2.

The sparse shard generates, from the one or more sums, a shard output vector that is the product of multiplying the shard input vector with the shard input matrix. The sparse shard, for example through a second crossbar, can rearrange the received sums depending on how operands for the products generated by the multiplier circuits were ordered by the first crossbar.

Figure 6:
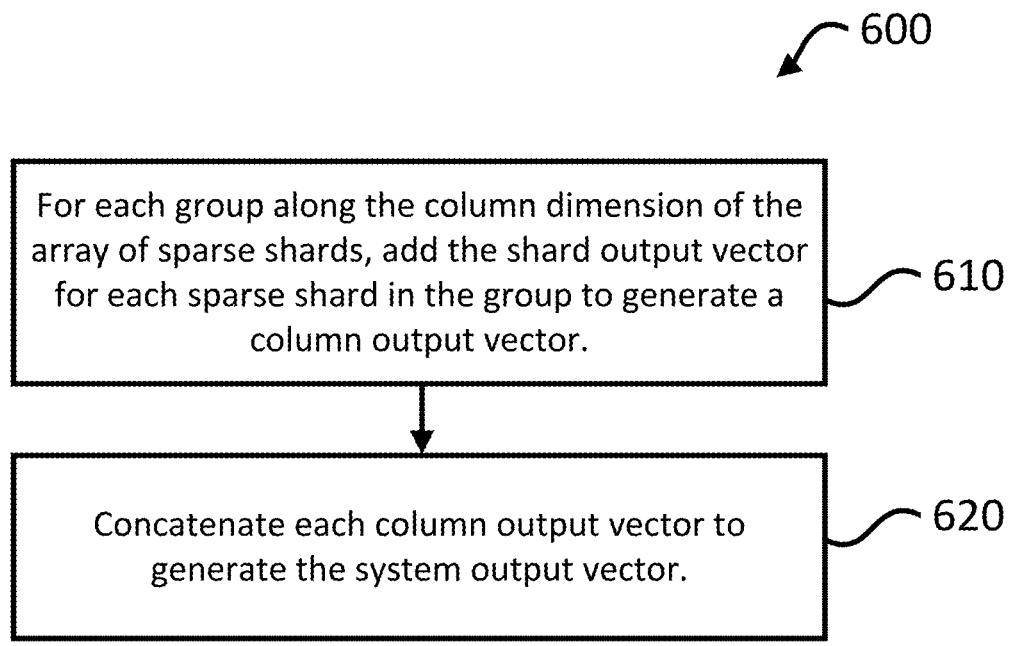
FIG. 6 is a flow diagram of an example process of generating a system output vector representing the product of a system input vector and a system input matrix from the multiple sparse shards.

FIG. 6 is a flow diagram of an example process 600 of generating a system output vector representing the product of a system input vector and a system input matrix from the multiple sparse shards. A system of sparse shards, such as the sparse matrix multiplication system 100 of FIG. 1, can perform the process 600.

According to block 610 and for each group of sparse shards along a column dimension of an array of sparse shards, add the shard output vector for each sparse shard in the group to generate a column output vector for the group. FIG. 7C, described below, shows an example grouping of sparse shards according to respective shard input matrices. The dimension along which groups of sparse shards are formed can vary from implementation-to-implementation. For example, depending on the direction in which the system input matrix and the system input vector are fed into the array of sparse shards, the groups can be along rows of the array, as opposed to columns.

The system concatenates each column output vector to generate the system output vector, according to block 620. The system output vector is the product of multiplying the system input matrix with the system input vector. In some implementations and as described in more detail herein with reference to FIG. 9, the system can receive a system input matrix in which columns of the matrix are permuted, for example to more evenly distribute the occurrence of non-zero values across sub-matrices assigned to the sparse shards. In those implementations, the system can be configured to rearrange elements of the concatenated system output vector to reverse the original permutation. The system can receive data defining the re-ordering as part of receiving the system input matrix, the control values, and data defining a partitioning for the system input matrix.

Figure 7A:
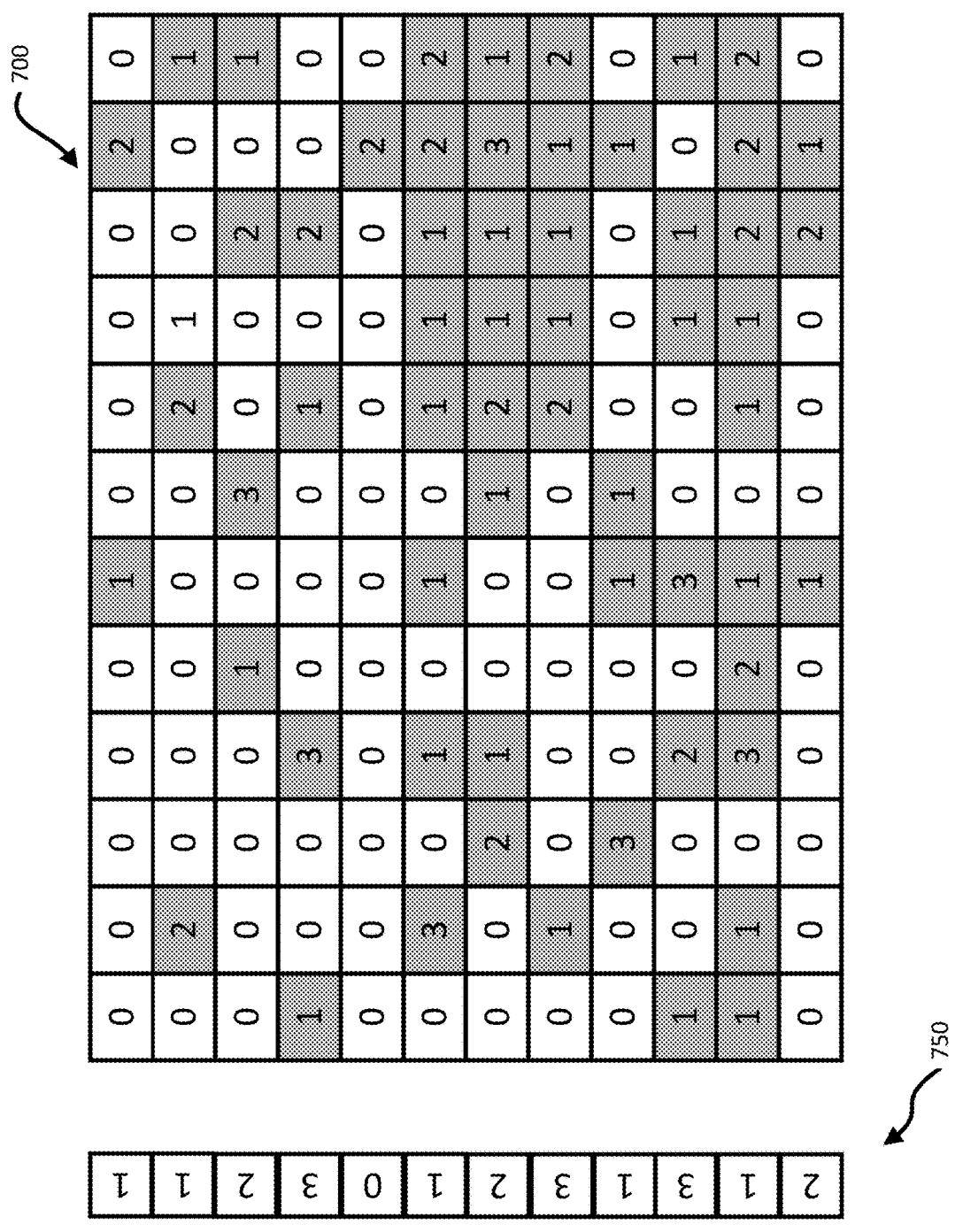
Figure 7B:
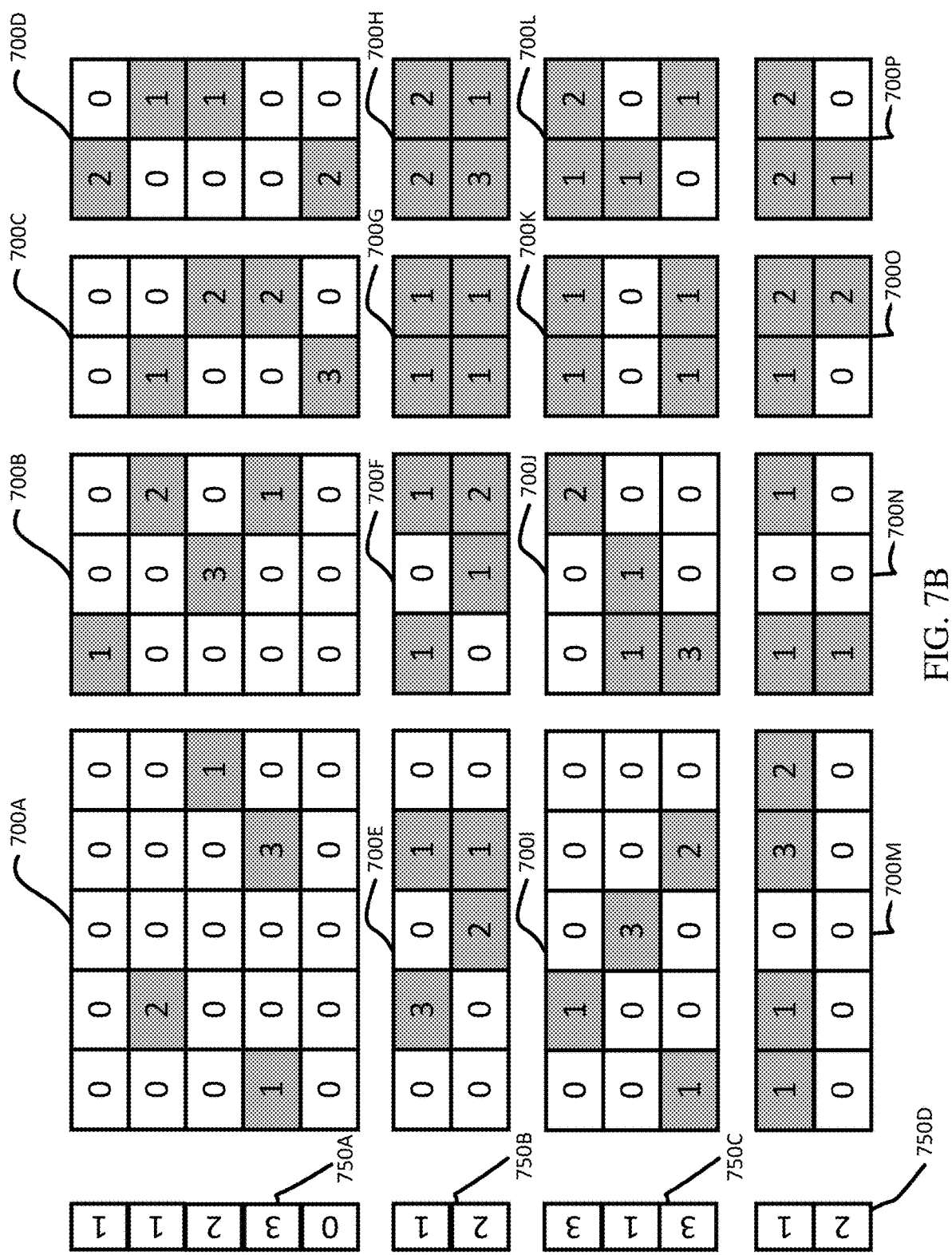
FIG. 7B is an illustration of a partitioning of the system input matrix and system input vector.
Figure 7C:
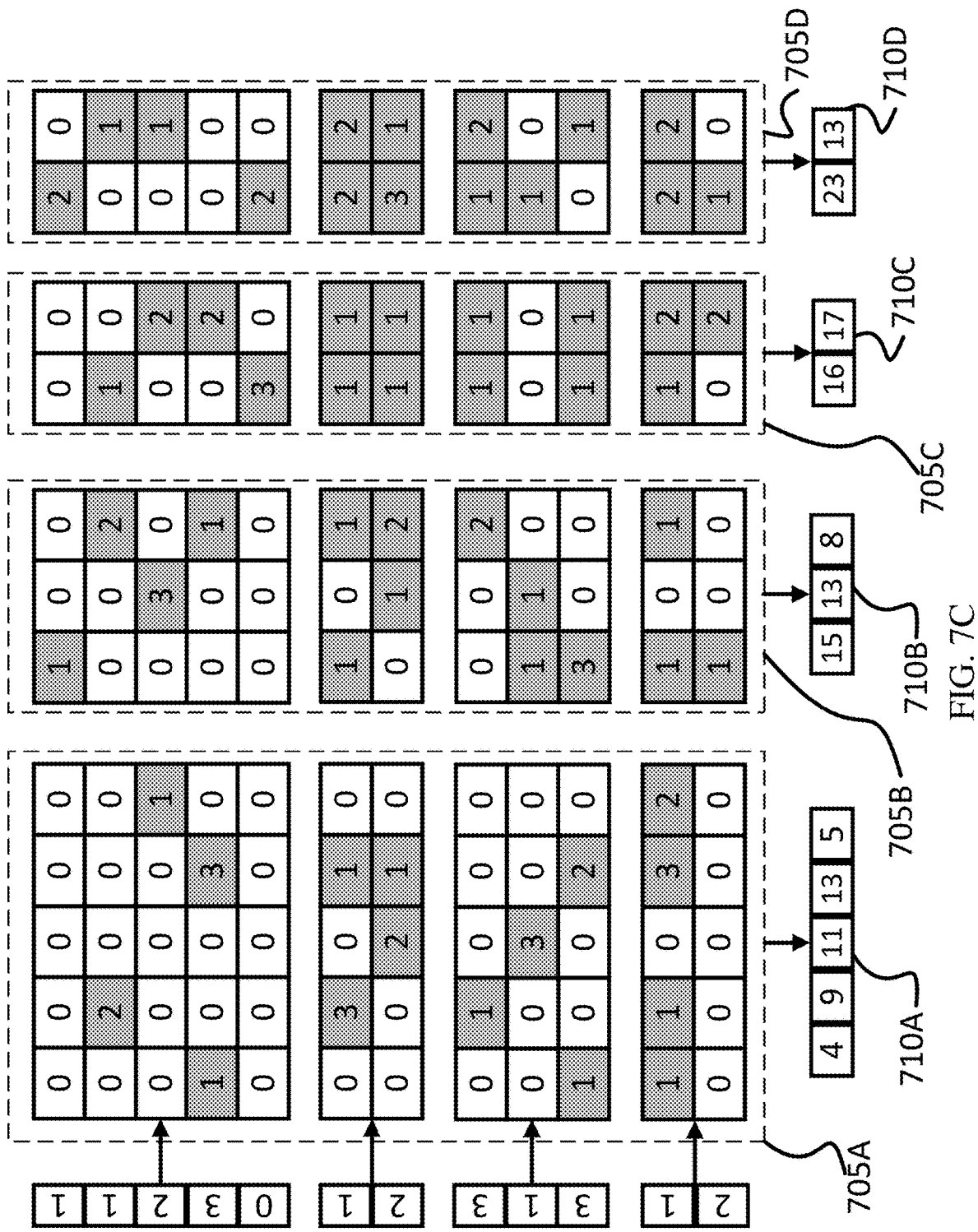
FIG. 7C is an illustration of the partitioned system input matrix and a system output vector representing the product of multiplying the system input matrix and the system input vector.

FIGS. 7A-C and corresponding description illustrate an example multiplication between an example sparse matrix 700 and a vector 750. For purpose of illustration, the multiplication is described as performed on a system with a 4×4 array of 16 sparse shards.

FIG. 7A is an illustration of an example system input matrix 700 and a system input vector 750. In this illustration, the system input matrix 700 is shown with integer values, although it is understood that elements could be of other values, for example floating point values. Also, in FIGS. 7A-C, the non-zero valued elements of the various matrices, including the system input matrix 700, are shown as shaded cells.

FIG. 7B is an illustration of a partitioning of the system input matrix 700 and system input vector 750. In this example, the system input matrix 700 is partitioned into sixteen sub-matrices 700A-P, one for each sparse shard of a 4×4 array. The system input vector 750 is partitioned into four sub-vectors 750A-D, one for each column of the 4×4 array of sparse shards.

One example mapping of sub-vectors and sub-matrices to sixteen sparse shards (referred to as sparse shards A-P) is as shown in TABLE 1, below:

TABLE 1

| Sparse Shard | Input Sub-Vector | Input Sub-Matrix |
|---|---|---|
| A | 750A | 700A |
| B | 750A | 700B |
| C | 750A | 700C |
| D | 750A | 700D |
| E | 750B | 700E |
| F | 750B | 700F |
| G | 750B | 700G |
| H | 750B | 700H |
| I | 750C | 700I |
| J | 750C | 700K |
| K | 750C | 700K |
| L | 750C | 700L |
| M | 750D | 700M |
| N | 750D | 700N |
| O | 750D | 700O |
| P | 750D | 700P |

FIG. 7C is an illustration of the partitioned system input matrix 700 and a system output vector 770 representing the product of multiplying the system input matrix and the system input vector 750. FIG. 7C shows the partitioned matrices grouped along columns 705A-D. As described herein with reference to FIG. 6, the system can add up shard output vectors for each column of an array of sparse shards, and generate a column output vector. In FIG. 7C, column output vectors 710A-D correspond to the columns 705A-D. The system can concatenate the column output vectors 710A-D to generate the system output vector as the product of multiplying a system input matrix with a system input vector.

Figure 8B:
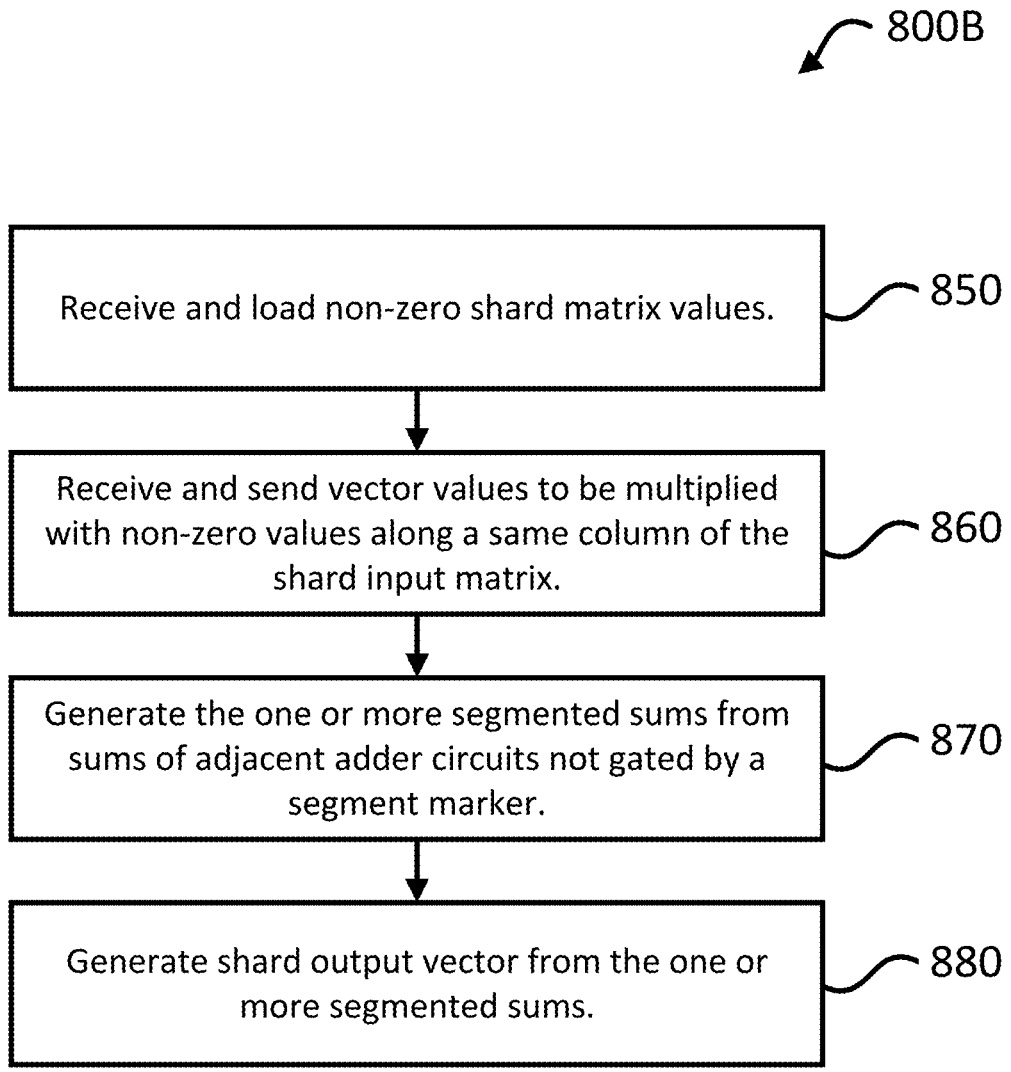
FIG. 8B is a flow diagram of an example process for performing matrix-vector multiplication using the sparse shard configured according to the process of FIG. 8A.

FIG. 8A-B are flow diagrams of example processes 600A-B for configuring a sparse shard using one or more control values of an input matrix and performing matrix multiplication, according to aspects of the disclosure.

FIG. 8A is a flow diagram of an example process 800A for configuring a sparse shard using one or more control values of a shard input matrix, according to aspects of the disclosure. A sparse shard, for example the sparse shard 200 of FIG. 2, can perform the process 800A.

The sparse shard receives one or more control values specifying the positions of non-zero values along each column of a shard input matrix, according to block 810.

The sparse shard loads non-zero values of the shard input matrix into registers of the multiplier circuits, according to block 820. As described herein with reference to FIG. 2, the sparse shard can implement a number of multiplier circuits equal to the pre-determined maximum non-zero threshold for the system. The sparse shard can load the non-zero values in order of appearance when reading the shard input matrix along a pre-determined read direction, such as left-to-right.

The sparse shard loads the one or more control values into crossbars of the sparse shard, according to block 830. A first crossbar, such as the crossbar 815 of FIG. 2, can be configured to receive the control values and arrange each value for the shard input vector to be received as input to one or more multiplier circuits matching the corresponding shard input matrix column that is multiplied with the vector value as part of matrix-vector multiplication. A second crossbar, such as the crossbar 235, of FIG. 2, can be configured to receive one or more sums from the adder circuits and rearrange received sums to obtain the correct output shard vector corresponding to multiplying the input shard matrix with the input shard vector.

The sparse shard loads the one or more control values in one or more segment markers configured to gate input to adder circuits based on the value of the control value, according to block 840.

FIG. 8B is a flow diagram of an example process for performing matrix-vector multiplication using the sparse shard configured according to the process 800A of FIG. 8A.

The sparse shard receives and loads the non-zero values of the input shard matrix, according to block 850.

The sparse shard receives and sends vector values for a shard input vector to multiplier circuits with non-zero values along the same columns of the shard input matrix, according to block 860.

The sparse shard generates one or more segmented sums from adjacent adder circuits not gated by a segment marker, according to block 870. As described herein with reference to FIGS. 2 and 8A, the sparse shard can aggregate sums between adder circuits that are not gated by segment markers, and configure the segment markers using the control values to gate adder circuits representing computations from different columns of the shard input matrix. When the sparse shard reaches a segment marker with an active gate bit, the sparse shard passes the segmented sum to a second crossbar configured to rearrange the segmented sums and generate the shard output vector.

The sparse shard generates a shard output vector from the one or more segmented sums, according to block 880. As described herein with reference to FIGS. 2 and 8A, a crossbar can be configured using the control values to receive one or more segmented sums from the adder circuits of the sparse shard. The crossbar can be further configured to rearrange the segmented sums to generate the correct shard output vector representing the product of multiplying the shard input matrix with the shard input vector.

FIG. 9 is a flow diagram of an example process 900 for generating sub-matrices from a system input matrix, according to aspects of the disclosure. One or more processors in one or more locations can perform the process 900. For example, a pre-processing engine, such as the pre-processing engine 150 of FIG. 1, can perform the process 900.

The pre-processing engine receives the system input matrix, according to block 910. The system input matrix can be, for example, a matrix as shown with the system input matrix 700 of FIG. 7A.

The pre-processing engine partitions the system input matrix into multiple candidate sub-matrices, according to block 920. As part of the partitioning, the pre-processing engine can receive parameters specifying predetermined dimension thresholds, and one or more parameter values indicating the number of sparse shards implemented by the system receiving the sub-matrices. For example, the pre-processing engine can be configured to generate 16 candidate sub-matrices (for a 4×4 array of sparse shards) within a dimension threshold of 8 rows by 8 columns. In some examples, the pre-processing engine can receive updated parameter values, for example for pre-processing input across different systems having different dimension thresholds and/or configurations of sparse shards.

In some implementations, before the pre-processing engine partitions the system input matrix, the pre-processing engine permutes columns in the system input matrix to evenly distribute the non-zero values in the candidate sub-matrices. For example, if non-zero values appear more frequently in exceed of a predetermined tolerance on one side of the input matrix than another, the pre-processing engine can be configured to change the order of the columns of the input matrix so that the occurrence of non-zero values are more spread out and therefore more evenly distributed among sparse shards after the partitioning.

If the pre-processing engine performs this ordering, the pre-processing engine passes data representing the ordering to the system as additional input, for example as part of partition data sent to the system having the array of sparse shards. The system can be configured to reorder elements of the system output vector according to the ordering, so as to match the output vector with the output of multiplying the system input matrix and the system input vector before columns of the system input matrix were permuted.

Permuting the columns of the system input matrix can improve the overall rate at which the system input matrix is processed by a system of sparse shards. For example, by permuting the columns, each sparse shard can be used more efficiently, particularly when, in some examples, some sparse shards may receive shard input matrices with only zero values, while other shards may receive shard input matrices with only non-zero values, or as many non-zero values up to a non-zero threshold.

The pre-processing engine determines whether there is a candidate sub-matrix with a non-zero value count greater than a predetermined non-zero threshold, according to block 930. If the pre-processing engine determines that there is a candidate sub-matrix with a non-zero value count greater than the predetermined non-zero threshold, then the pre-processing engine re-partitions sub-matrices along the same row or column as the candidate sub-matrix, according to block 940.

As shown in FIG. 7B, sub-matrices can be organized along columns and rows based on the position of their values in the input matrix. If the pre-processing engine determines, for example, that the sub-matrix 700J includes a non-zero value count higher than the non-zero threshold, then the pre-processing engine can re-partition sub-matrices along the row of sub-matrix 700J (including sub-matrices 700I, 700K, and 700L) and/or along the column of sub-matrix 700J (including sub-matrices 700B, 700F, and 700N). In performing the re-partitioning, the pre-processing engine uses the predetermined dimension threshold and performs the re-partition so that the number of candidate sub-matrices remains the same. For example, the pre-processing can split the candidate sub-matrix and redistribute rows/columns of the sub-matrices along the rows/columns of the determined candidate sub-matrix.

After re-partitioning the sub-matrices, the pre-processing engine again determines whether there is a candidate sub-matrix with a non-zero value count greater than the non-zero threshold, according to blocks 930 and 940. The pre-processing engine can repeat the determination and re-partitioning according to blocks 930 and 940 until determining that there are no candidate sub-matrices with a non-zero value count exceeding the maximum non-zero threshold, and proceed to block 950.

As shown in block 950, the pre-processing engine partitions the system input vector. Each sub-vector of the system input vector is input to each of a row or column of sparse shards, depending on how the buses feeding the array of sparse shards is arranged. The pre-processing engine partitions the vector so that the vector dimension can be multiplied with matrices in the receiving sparse shards, e.g., with valid dimensions for mathematically valid matrix multiplication.

For example as shown in FIGS. 7B-C, and TABLE 1, the vector 750 is partitioned into sub-vectors 750A-D, which are each passed to one or more sparse shards as input. Also in FIG. 7B, each the dimensions of each sub-vector 750A-D has the correct dimensions for multiplying with a corresponding sub-matrix 700A-P. For example, sub-vector 750B is 1×2 (row×column), and each of sub-matrices 700E-H have 2 rows, permitting valid matrix multiplication between the sub-vector 750B and the sub-matrices 700E-H.

As shown in block 960, the pre-processing engine generates control values for each candidate sub-matrix. As described with reference to FIGS. 3A-C, the pre-processing engine can generate a vector of control values that indicate a starting non-zero value for each column of a matrix. The pre-processing engine repeats this generation for each candidate sub-matrix, to generate corresponding control values for each sub-matrix.

The pre-processing engine outputs the control values and candidate sub-matrices, according to block 970. The pre-processing engine can output the control values and data specifying a partitioning of a system input matrix, for example to the system 100 as shown in FIG. 1.

Example Computing Environment

Figure 10:
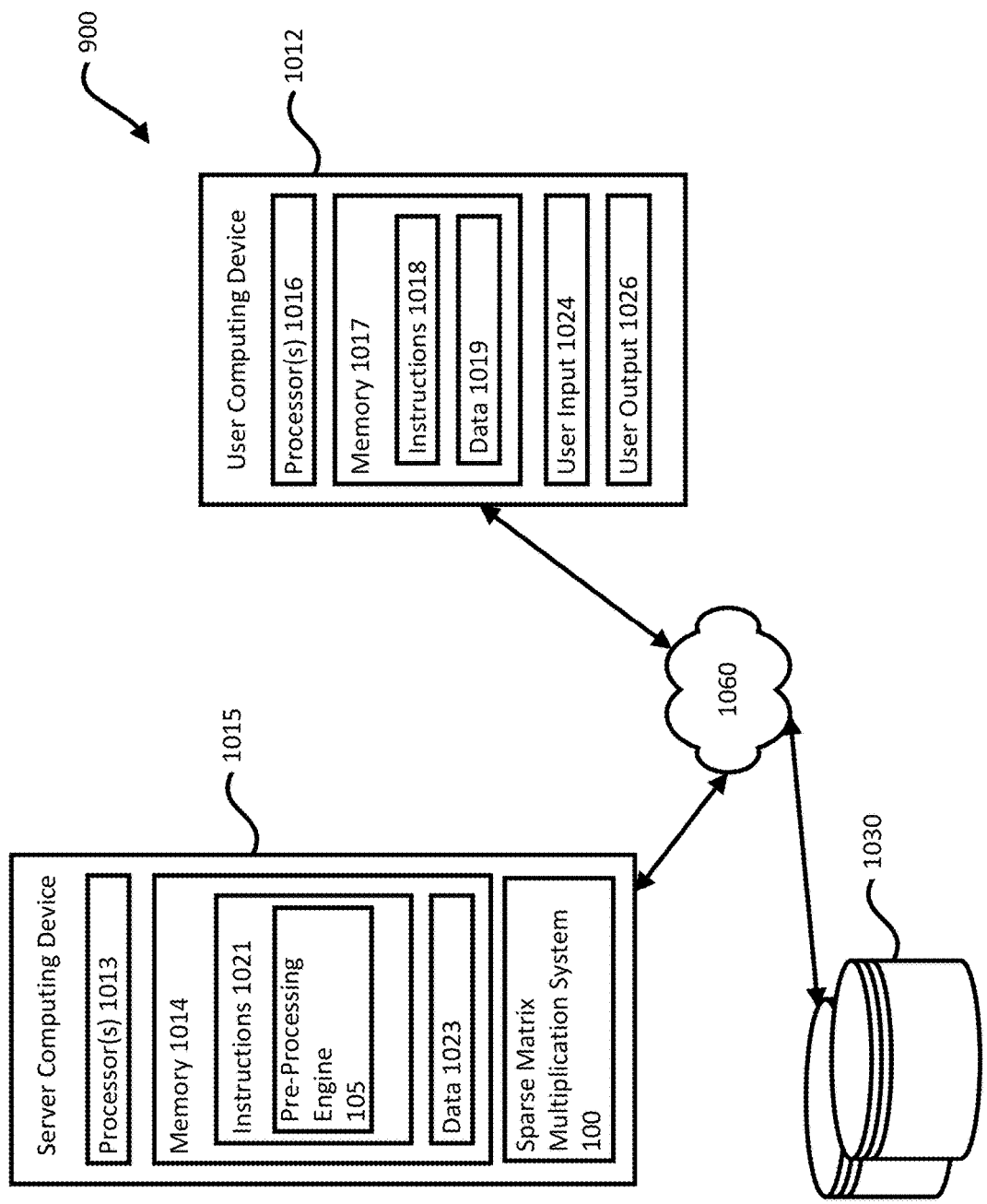
FIG. 10 is a block diagram of an example computing environment implementing the sparse matrix multiplication system, according to aspects of the disclosure.

FIG. 10 is a block diagram of an example computing environment implementing the sparse matrix multiplication system 100 and pre-processing engine 150, according to aspects of the disclosure. The pre-processing engine 150 can be implemented on one or more devices having one or more processors in one or more locations, such as in server computing device 1015. User computing device 1012 and the server computing device 1015 can be communicatively coupled to one or more storage devices 1030 over a network 1060. The storage device(s) 1030 can be a combination of volatile and non-volatile memory, and can be at the same or different physical locations than the computing devices 1012, 1015. For example, the storage device(s) 1030 can include any type of non-transitory computer readable medium capable of storing information, such as a hard-drive, solid state drive, tape drive, optical storage, memory card, ROM, RAM, DVD, CD-ROM, write-capable, and read-only memories.

The server computing device 1015 can include one or more processors 1013 and memory 1014. The memory 1014 can store information accessible by the processor(s) 1013, including instructions 1021 that can be executed by the processor(s) 1013. The memory 1014 can also include data 1023 that can be retrieved, manipulated or stored by the processor(s) 1013. The memory 1014 can be a type of non-transitory computer readable medium capable of storing information accessible by the processor(s) 1013, such as volatile and non-volatile memory. The processor(s) 1013 can include one or more central processing units (CPUs), graphic processing units (GPUs), field-programmable gate arrays (FGPAs), and/or application-specific integrated circuits (ASICs), such as tensor processing units (TPUs).

The server computing device 1015 can implement the sparse matrix multiplication system 100 in hardware, for example as a system-on-a-chip. The system 100 can be implemented as part of a physical chip slotted or installed into the server computing device 1015. The system 100 is configured to communicate with other components of the server computing device 1015, such as The instructions 1021 can include one or more instructions that when executed by the processor(s) 1013, causes the one or more processors to perform actions defined by the instructions. The instructions 1021 can be stored in object code format for direct processing by the processor(s) 1013, or in other formats including interpretable scripts or collections of independent source code modules that are interpreted on demand or compiled in advance. The instructions 1021 can include instructions for implementing the sparse shard 400 consistent with aspects of this disclosure. The pre-processor engine 105 can be executed using the processor(s) 1013, and/or using other processors remotely located from the server computing device 1015.

The data 1023 can be retrieved, stored, or modified by the processor(s) 1013 in accordance with the instructions 1021. The data 1023 can be stored in computer registers, in a relational or non-relational database as a table having a plurality of different fields and records, or as JSON, YAML, proto, or XML documents. The data 1023 can also be formatted in a computer-readable format such as, but not limited to, binary values, ASCII or Unicode. Moreover, the data 1023 can include information sufficient to identify relevant information, such as numbers, descriptive text, proprietary codes, pointers, references to data stored in other memories, including other network locations, or information that is used by a function to calculate relevant data.

The user computing device 1012 can also be configured similar to the server computing device 1015, with one or more processors 1016, memory 1017, instructions 1018, and data 1019. The user computing device 1012 can also include a user output 1026, and a user input 1024. The user input 1024 can include any appropriate mechanism or technique for receiving input from a user, such as keyboard, mouse, mechanical actuators, soft actuators, touchscreens, microphones, and sensors.

The server computing device 1015 can be configured to transmit data to the user computing device 1012, and the user computing device 1012 can be configured to display at least a portion of the received data on a display implemented as part of the user output 1026. The user output 1026 can also be used for displaying an interface between the user computing device 1012 and the server computing device 1015. The user output 1026 can alternatively or additionally include one or more speakers, transducers or other audio outputs, a haptic interface or other tactile feedback that provides non-visual and non-audible information to the platform user of the user computing device 1012.

Although FIG. 10 illustrates the processors 1013, 1016 and the memories 1014, 1017 as being within the computing devices 1015, 1012, components described in this specification, including the processors 1013, 1016 and the memories 1014, 1017 can include multiple processors and memories that can operate in different physical locations and not within the same computing device. For example, some of the instructions 1021, 1018 and the data 1023, 1019 can be stored on a removable SD card and others within a read-only computer chip. Some or all of the instructions and data can be stored in a location physically remote from, yet still accessible by, the processors 1013, 1016. Similarly, the processors 1013, 1016 can include a collection of processors that can perform concurrent and/or sequential operation. The computing devices 1015, 1012 can each include one or more internal clocks providing timing information, which can be used for time measurement for operations and programs run by the computing devices 1015, 1012.

The server computing device 1015 can be configured to receive requests to process data from the user computing device 1012. For example, the environment 1000 can be part of a computing platform configured to provide a variety of services to users, through various user interfaces and/or APIs exposing the platform services. As part of performing the services, the server computing device 1015 can process incoming data using the system 100. For example, if the service is training a machine learning model, then the server computing device 1015 can be configured to perform multiplication operations as part of training the machine learning model, using the system 100.

The devices 1012, 1015 can be capable of direct and indirect communication over the network 1060. The devices 1015, 1012 can set up listening sockets that may accept an initiating connection for sending and receiving information. The network 1060 itself can include various configurations and protocols including the Internet, World Wide Web, intranets, virtual private networks, wide area networks, local networks, and private networks using communication protocols proprietary to one or more companies. The network 1060 can support a variety of short- and long-range connections. The short- and long-range connections may be made over different bandwidths, such as 2.402 GHz to 2.480 GHz (commonly associated with the Bluetooth® standard), 2.4 GHz and 5 GHz (commonly associated with the Wi-Fi® communication protocol); or with a variety of communication standards, such as the LTE® standard for wireless broadband communication. The network 1060, in addition or alternatively, can also support wired connections between the devices 1012, 1015, including over various types of Ethernet connection.

Although a single server computing device 1015 and user computing device 1012 are shown in FIG. 10, it is understood that the aspects of the disclosure can be implemented according to a variety of different configurations and quantities of computing devices, including in paradigms for sequential or parallel processing, or over a distributed network of multiple devices. In some implementations, aspects of the disclosure can be performed on a single device, and any combination thereof. Further, although the pre-processing engine and the sparse matrix multiplication system 100 as shown as implemented on the same server computing device 1015, in some implementations the pre-processing engine 150 is implemented on one or more server computing devices and/or the user computing device 1012, separate from the server computing device 1015.

Aspects of this disclosure can be implemented in digital circuits, computer-readable storage media, as one or more computer programs, or a combination of one or more of the foregoing. The computer-readable storage media can be non-transitory, e.g., as one or more instructions executable by a computing device and stored on a tangible storage device.

In this specification the phrase "configured to" is used in different contexts related to computer systems, hardware, or part of a computer program, engine, or module. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program, engine, or module is said to be configured to perform one or more operations, this means that the computer program includes one or more program instructions, that when executed by one or more computers, causes the one or more computers to perform the one or more operations.

While operations shown in the drawings and recited in the claims are shown in a particular order, it is understood that the operations can be performed in different orders than shown, and that some operations can be omitted, performed more than once, and/or be performed in parallel and/or simultaneously with other operations. Further, the separation of different system components configured for performing different operations should not be understood as requiring the components to be separated. The components, modules, programs, and engines described can be integrated together as a single system, or be part of multiple systems.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the examples should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible implementations. Further, the same reference numbers in different drawings can identify the same or similar elements.

The invention claimed is:

1. A system comprising:
a sparse shard comprising a plurality of multiplier circuits, wherein the sparse shard is configured to:
  receive a shard input matrix comprising a number of non-zero values equal to or less than a predetermined maximum non-zero threshold and having a dimension equal to or less than a predetermined dimension threshold, the non-zero threshold corresponding to a number of multiplier circuits of the sparse shard and the dimension threshold corresponding to a maximum matrix input size that the sparse shard can process;
  receive a shard input vector comprising a plurality of vector values;
  receive, for each of the multiplier circuits, a respective non-zero value of the shard input matrix;
  generate, by the plurality of multiplier circuits, one or more products of vector values multiplied with the respective non-zero values of the shard input matrix; and
  generate, as output to the sparse shard and using the one or more products, a shard output vector that is the product of applying the shard input vector to the shard input matrix.

2. The system of claim 1, wherein the length of the shard output vector is greater than one.

3. The system of claim 1, wherein the sparse shard is one of a plurality of sparse shards configured to:
receive a plurality of shard input matrices that are sub-matrices of a system input matrix;
receive a plurality of shard input vectors that are sub-vectors of a system input vector; and
generate, by the plurality of sparse shards, a system output vector representing the product of applying the system input vector to the system input matrix.

4. The system of claim 3, wherein:
the plurality of sparse shards are arranged as a systolic array comprising one or more groups of sparse shards along a column dimension of the systolic array; and
in generating the system output vector, the plurality of sparse shards are further configured to:
  for each group along the column dimension of the systolic array, add a respective shard output vector for each sparse shard in the group together to generate a respective column output vector; and
concatenate the respective column output vector of each group to generate the system output vector.

5. The system of claim 1, wherein each multiplier circuit is coupled to a respective register comprising the respective non-zero value from the respective shard input matrix for the sparse shard.

6. The system of claim 5, wherein the number of multiplier circuits in the plurality of multiplier circuits is equal to the predetermined maximum non-zero threshold.

7. The system of claim 5, wherein:
the sparse shard further comprises a crossbar circuit; and
the sparse shard is further configured to:
receive, by the crossbar circuit, the plurality of vector values of the shard input vector; and
send, as input to each of the plurality of multiplier circuits and by the crossbar circuit, a vector value of the plurality of vector values.

8. The system of claim 7, wherein the sparse shard is further configured to load non-zero values of a same column in the shard input matrix in registers of adjacent multiplier circuits of the plurality of multiplier circuits.

9. The system of claim 8, wherein:
the sparse shard is further configured to receive one or more control values at least specifying positions of non-zero values along each column of the shard input matrix; and
the crossbar circuit for the sparse shard is further configured to:
receive the one or more control values; and
send, according to the one or more control values, vector values to be multiplied with non-zero values along a same column of the shard input matrix to adjacent multiplier circuits.

10. The system of claim 9, wherein:
the sparse shard further comprises a plurality of adder circuits;
the sparse shard further comprises one or more segment markers, wherein each segment marker is configured to gate input to a respective adder circuit of the plurality of adder circuits based on a value for a respective control value loaded in the segment marker; and
the sparse shard is further configured to:
load at least a portion of the one or more control values in the one or more segment markers, wherein adder circuits for non-zero values in a first column of the shard input matrix are gated from receiving input of adjacent adder circuits comprising non-zero values in a second column of the shard input matrix different from the first column; and
generate, by the plurality of adder circuits, one or more sums of the one or more products, wherein each of the one or more sums is a respective segmented sum of one or more non-zero values of a column of the shard input matrix multiplied with one or more respective values of the shard input vector.

11. The system of claim 10, wherein the plurality of adder circuits form a parallel segmented sum circuit and each of the one or more segmented sums are sums of outputs to adjacent adder circuits not gated by a segment marker.

12. The system of claim 10, wherein:
the crossbar circuit is a first crossbar circuit; and
the sparse shard further comprises a second crossbar circuit configured to:
receive the one or more segmented sums; and
arrange, according to the one or more control values, the one or more segmented sums to generate the respective shard output vector for the sparse shard.

13. The system of claim 12, wherein the second crossbar circuit forms a Beneš network and the shard input matrix is a square matrix.

14. A method comprising:
receiving, by a sparse shard comprising a plurality of multiplier circuits, a shard input matrix comprising a number of non-zero values equal to or less than a predetermined maximum non-zero threshold and having a dimension equal to or less than a predetermined dimension threshold, the non-zero threshold corresponding to a number of multiplier circuits of the sparse shard and the dimension threshold corresponding to a maximum matrix input size that the sparse shard can process, and a shard input vector comprising a plurality of vector values;
receiving, for each of the multiplier circuits, the respective non-zero value of the shard input matrix;
generating, by the plurality of multiplier circuits of the sparse shard, one or more products of respective vector values multiplied with the respective non-zero values of the shard input matrix; and
generating, by the sparse shard, as output to the sparse shard and using the one or more products, a shard output vector that is the product of applying the shard input vector to the shard input matrix.

15. The method of claim 14, wherein generating, by the sparse shard, the shard output vector comprises generating the shard output vector with a length greater than one.

16. The method of claim 14, wherein the sparse shard is one of a plurality of sparse shards configured to:
receive a plurality of shard input matrices that are sub-matrices of a system input matrix;
receive a plurality of shard input vectors that are sub-vectors of a system input vector; and
generate, by the plurality of sparse shards, a system output vector representing the product of applying the system input vector to the system input vector.

17. The method of claim 16, wherein:
the plurality of sparse shards are arranged as a systolic array comprising one or more groups of sparse shards along a column dimension of the systolic array; and
generating the system output vector comprises:
for each group along the column dimension of the systolic array, adding a respective shard output vector for each sparse shard in the group together to generate a respective column output vector; and
concatenating the respective column output vector of each group to generate the system output vector.

18. The method of claim 14, wherein each multiplier circuit is coupled to a respective register comprising a respective non-zero value from the respective shard input matrix for the sparse shard.

19. The method of claim 18, wherein the number of multiplier circuits in the plurality of multiplier circuits is equal to the predetermined maximum non-zero threshold.

20. One or more non-transitory computer-readable storage media storing instructions that when executed by a system comprising a plurality of sparse shards, causes the system to perform operations comprising:
receiving, by a sparse shard comprising a plurality of multiplier circuits, a shard input matrix comprising a number of non-zero values equal to or less than a predetermined maximum non-zero threshold and having a dimension equal to or less than a predetermined dimension threshold, the non-zero threshold corresponding to a number of multiplier circuits of the sparse shard and the dimension threshold corresponding to a maximum matrix input size that the sparse shard can process, and a shard input vector comprising a plurality of vector values;

receiving, for each of the multiplier circuits, a respective non-zero value of the shard input matrix;

generating, by the plurality of multiplier circuits of the sparse shard, one or more products of respective vector values multiplied with the respective non-zero values; and generating, as output to the sparse shard and using the one or more products, a shard output vector that is the product of applying the shard input vector to the shard input matrix.

* * * * *